United States Patent
Cho et al.

(10) Patent No.: US 10,345,959 B2
(45) Date of Patent: Jul. 9, 2019

(54) WATCH TERMINAL AND METHOD OF CONTROLLING THE SAME

(71) Applicant: LG ELECTRONICS INC., Seoul (KR)

(72) Inventors: Taehoon Cho, Seoul (KR); Sanghyun Eim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/905,693

(22) Filed: Feb. 26, 2018

(65) Prior Publication Data

US 2018/0181256 A1 Jun. 28, 2018

Related U.S. Application Data

(63) Continuation of application No. 14/806,363, filed on Jul. 22, 2015, now Pat. No. 9,939,948.

(30) Foreign Application Priority Data

Apr. 3, 2015 (KR) .......................... 10-2015-0047546

(51) Int. Cl.
*G04F 1/00* (2006.01)
*G06F 1/16* (2006.01)
(Continued)

(52) U.S. Cl.
CPC .......... *G06F 3/0416* (2013.01); *G02B 27/20* (2013.01); *G04F 1/005* (2013.01); *G06F 1/163* (2013.01);
(Continued)

(58) Field of Classification Search
None
See application file for complete search history.

(56) References Cited

U.S. PATENT DOCUMENTS 5,793,032 A * 8/1998 Bard ................. G04B 37/0016
235/462.15
2006/0241864 A1 10/2006 Rosenberg
(Continued)

FOREIGN PATENT DOCUMENTS

EP 2 733 581 A2 5/2014
EP 2 827 226 A2 1/2015
(Continued)

*Primary Examiner* — David D Davis
(74) *Attorney, Agent, or Firm* — Birch, Stewart, Kolasch & Birch, LLP

(57) ABSTRACT

A watch terminal includes a memory, at least one of a sensor and a touchscreen configured to receive a touch input from a user. A rim of the touchscreen has a specific shape and a wireless communication unit is configured to pair with at least one of an external terminal. A controller is coupled to the memory, the at least one of the sensor, the touchscreen and the wireless communication unit. The controller controls the wireless communication unit to transmit a control signal to a specific external terminal currently operating in a presentation mode, control the touchscreen to output a counting indicator indicating a current page, control the touchscreen to output a circular progress indicator indicating a progress status of the current page among the total page on a circular rim of the touchscreen, and provide a warning feedback when it exceeds a set target time during the presentation mode.

12 Claims, 39 Drawing Sheets

(51) Int. Cl.
*G06F 3/01* (2006.01)
*G06F 3/16* (2006.01)
*G02B 27/20* (2006.01)
*G06F 3/041* (2006.01)
*G06F 3/0346* (2013.01)
*G06F 3/0484* (2013.01)
*G06F 3/0488* (2013.01)

(52) U.S. Cl.
CPC .............. *G06F 3/014* (2013.01); *G06F 3/016* (2013.01); *G06F 3/017* (2013.01); *G06F 3/0346* (2013.01); *G06F 3/0488* (2013.01); *G06F 3/04842* (2013.01); *G06F 3/04886* (2013.01); *G06F 3/16* (2013.01); *G06F 2200/1637* (2013.01); *G06F 2203/04104* (2013.01); *G06F 2203/04808* (2013.01)

(56) References Cited

U.S. PATENT DOCUMENTS

| | | |
|---|---|---|
| 2009/0153289 A1 | 6/2009 | Hope et al. |
| 2009/0164219 A1 | 6/2009 | Yeung et al. |
| 2011/0199303 A1 | 8/2011 | Simpson |
| 2012/0127070 A1 | 5/2012 | Ryoo et al. |
| 2012/0194976 A1 | 8/2012 | Golko et al. |
| 2012/0235902 A1 | 9/2012 | Eisenhardt et al. |
| 2014/0092002 A1 | 4/2014 | Manzari et al. |
| 2014/0139422 A1* | 5/2014 | Mistry ............... G06F 3/014 345/156 |
| 2014/0292653 A1 | 10/2014 | Kamba et al. |
| 2014/0349256 A1 | 11/2014 | Connor |
| 2015/0061842 A1* | 3/2015 | Yoon ............... G04G 21/04 340/12.5 |
| 2016/0291768 A1* | 10/2016 | Cho ............... G06F 3/16 |

FOREIGN PATENT DOCUMENTS

| | | | | |
|---|---|---|---|---|
| EP | 2827226 A2 | * | 1/2015 | .......... H04M 1/7253 |
| EP | 2 843 511 A1 | | 3/2015 | |
| KR | 20110093222 A | * | 8/2011 | ............. G06F 3/014 |
| KR | 20130075849 A | * | 7/2013 | ............. G06F 3/0483 |
| KR | 20140064694 A | * | 5/2014 | ............. G06F 3/014 |
| KR | 20150025385 A | * | 3/2015 | ............. G04G 21/04 |
| WO | WO 2009/093027 A1 | | 7/2009 | |

* cited by examiner

FIG. 14
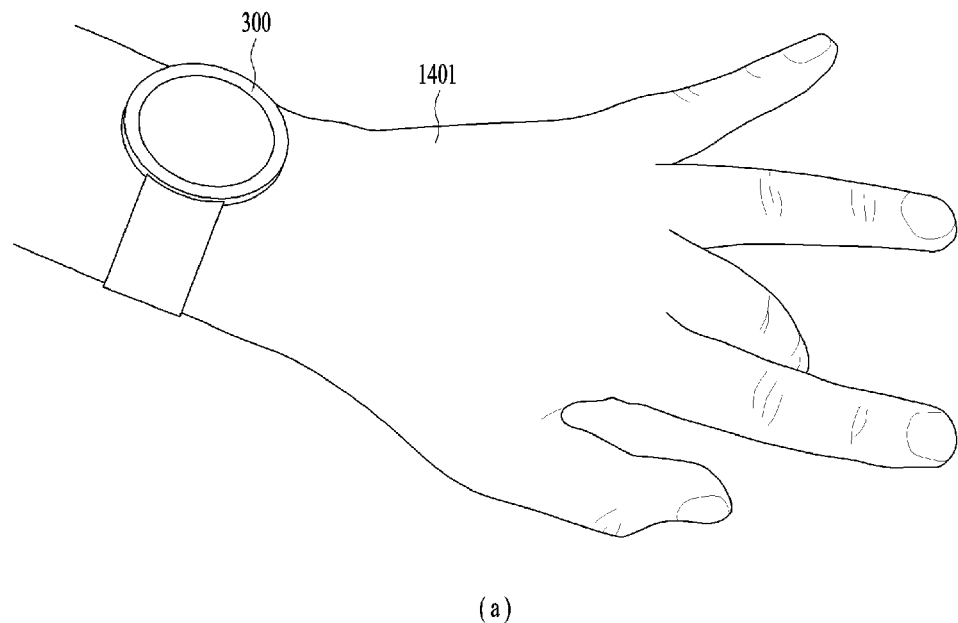
(a)
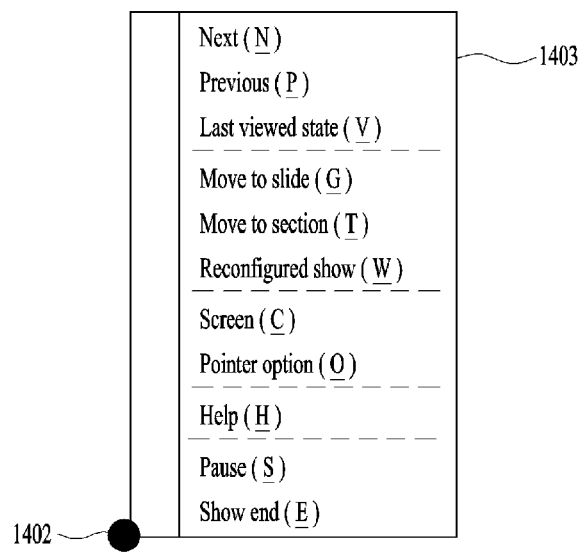
(b)

FIG. 17
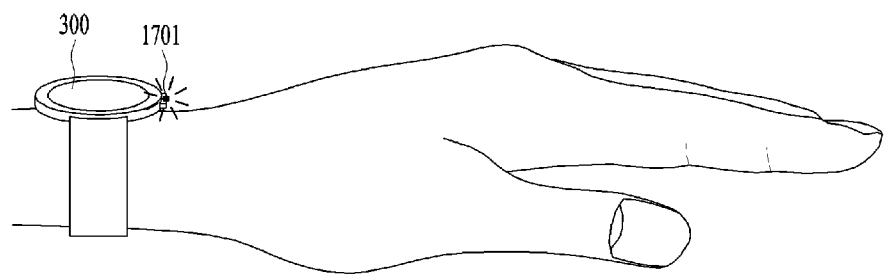
Pointer type
(a)
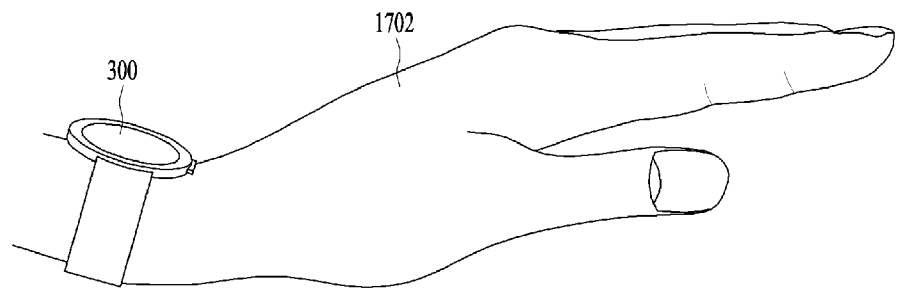
Switch mode by movement of muscles by lifting a wrist
(b)
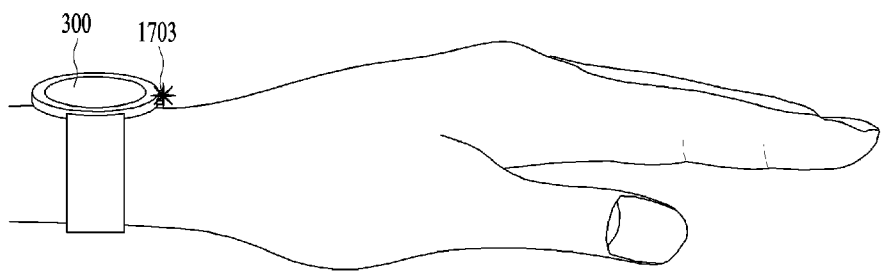
Highlight type
(c)

FIG. 26
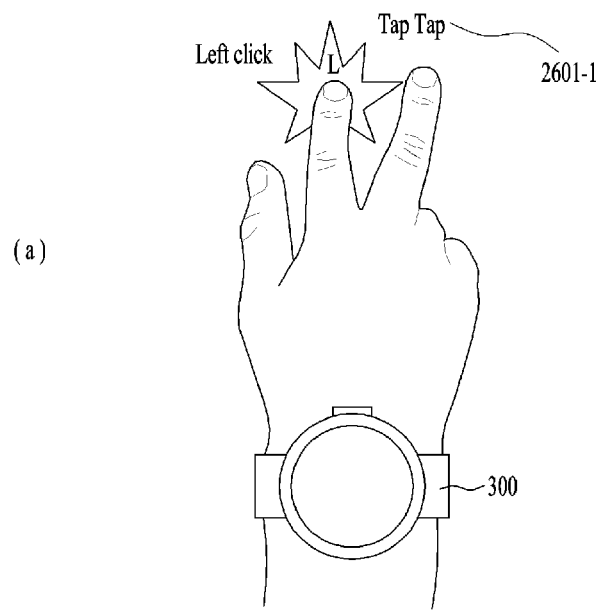
(a)
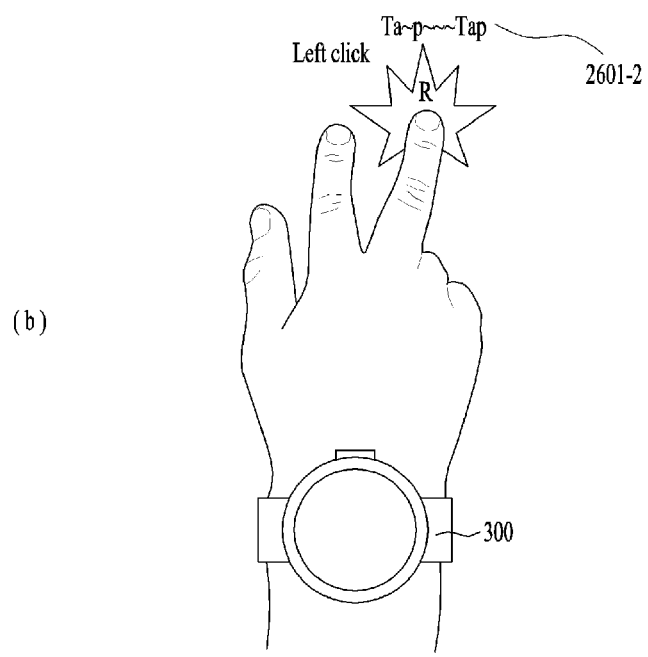
(b)

FIG. 32
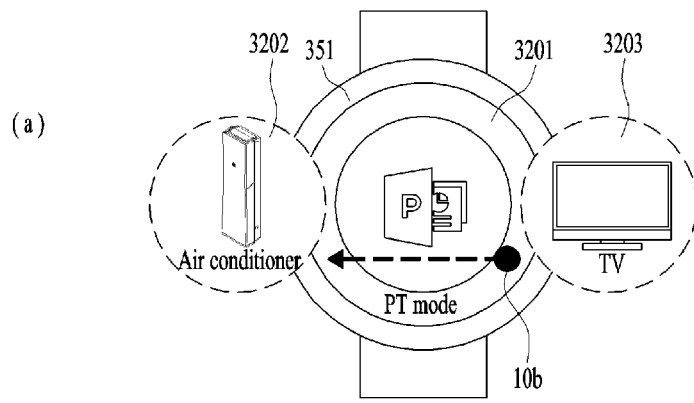
(a)
Write a connected device on a watch.
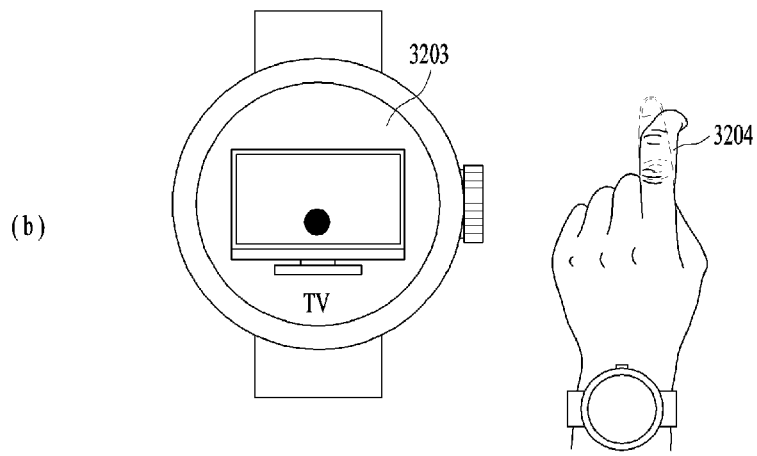
(b)
Start TV control FIG. 33
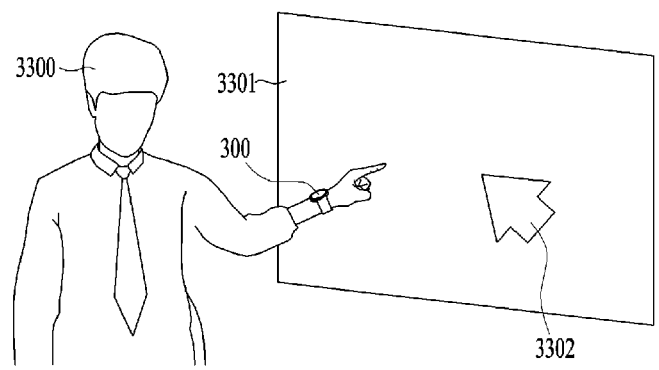
1st mode
(a)
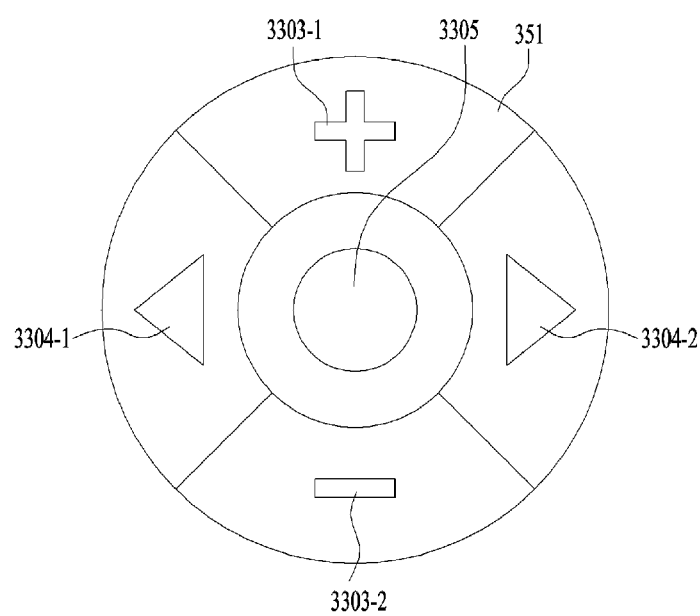
2nd mode
(b)

FIG. 34
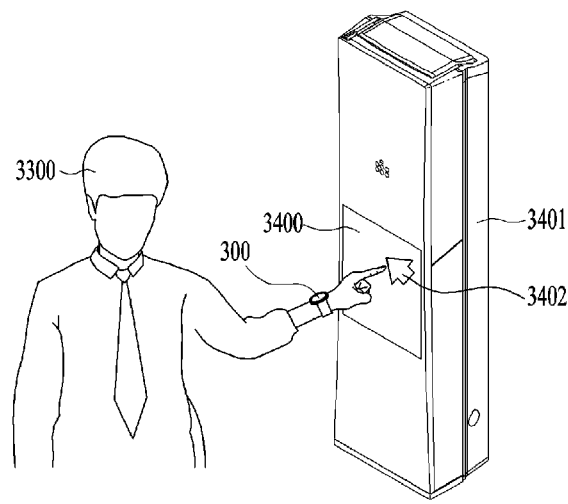
1st mode
(a)
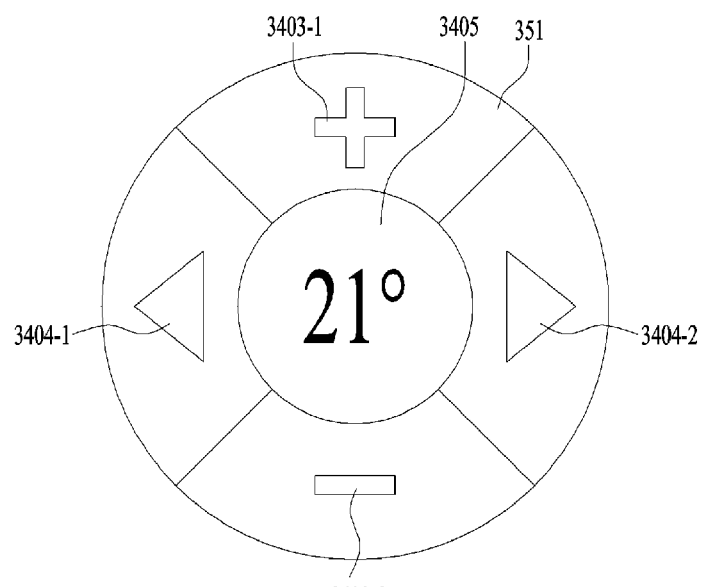
2nd mode
(b)

FIG. 35

| Common Gesture | TV (3301) | Air conditioner (3401) | Refrigerator display (3504) | PC (3505) | Digital SignageC (3506) |
|---|---|---|---|---|---|
| 3501 | Device Power ON / OFF | Device Power ON / OFF | Control Mode(display) ON / OFF | Device Power ON / OFF | Control Mode ON / OFF |
| 3502 | Mouse movement | | | | |
| 3503 | Mouse click | | | | |

FIG. 36

| Common Gesture | TV (3301) | Air conditioner | Refrigerator display (3504) | PC (3305) | Digital SignageC (3506) |
|---|---|---|---|---|---|
| 3601 | Switch channel | Adjust wind direction | Shift menu Move to next/previous recipe | PPT: Move to previous/next page | Shift menu Previous/Next advertisement |
| 3602 | Adjust volume | Change temperature | Shift menu Page scroll | Scroll | Shift menu |

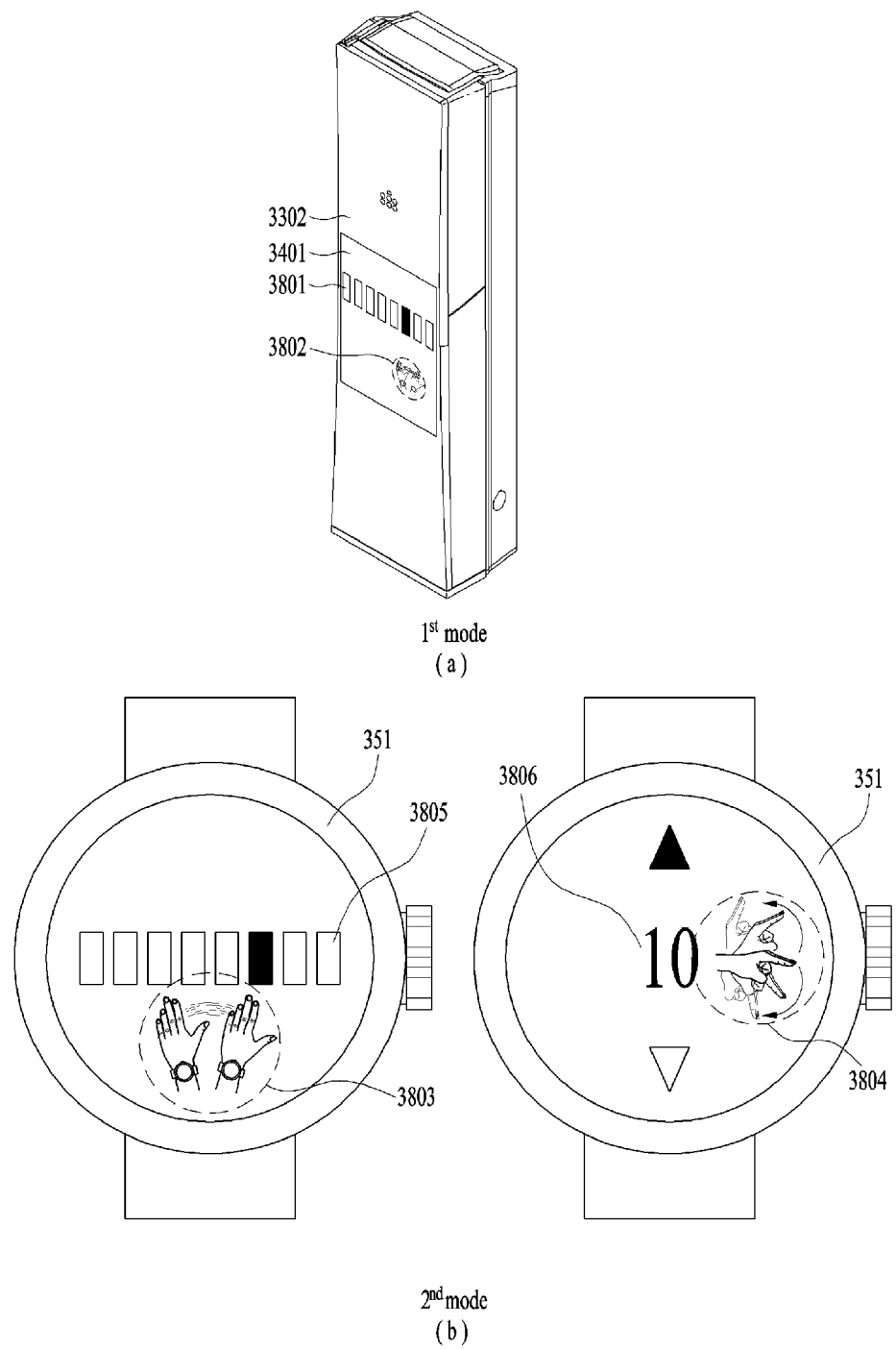

WATCH TERMINAL AND METHOD OF CONTROLLING THE SAME

CROSS REFERENCE TO RELATED APPLICATIONS

This application is a Continuation of co-pending application Ser. No. 14/806,363, filed on Jul. 22, 2015, which claims priority under 35 U.S.C. § 119(a) to Application No. 10-2015-0047546, filed in Republic of Korea on Apr. 3, 2015, all of which are hereby expressly incorporated by reference into the present application.

BACKGROUND OF THE INVENTION

Field of the Invention

The present invention relates to a mobile terminal, and more particularly, to a mobile terminal and controlling method thereof. Although the present invention is suitable for a wide scope of applications, it is particularly suitable for facilitating the use of a terminal in further consideration of user's convenience.

Discussion of the Related Art

A mobile terminal is a device which may be configured to perform various functions. Examples of such functions include data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

Generally, terminals can be classified into mobile terminals and stationary terminals according to a presence or non-presence of mobility. And, the mobile terminals can be further classified into handheld terminals and vehicle mount terminals according to availability for hand-carry.

There are ongoing efforts to support and increase the functionality of mobile terminals. Such efforts include software and hardware improvements, as well as changes and improvements in the structural components which form the mobile terminal.

The recent tendency of a mobile terminal market attempts to develop mobile terminals of various types to meet the diversity of the consumer's needs. The types of the developed mobile terminals are focused on the configuration that can emphasize the portability of the mobile terminal. The mobile terminal types for high portability can include such a type wearable on a user's body as a watch type, a glasses type, a necklace type and the like and are called wearable mobile terminals.

Considering the fact that a wearable mobile terminal is worn on a user's body, there are various ways for utilizing the fact. Particularly, since a wearable mobile terminal is able to exchange data with an external mobile terminal, it may be able to play a role as a remote controller capable of controlling the external mobile terminal. Thus, the demand for researching and developing a control method of controlling an external mobile terminal more appropriately and effectively by utilizing a wearable mobile terminal is increasingly rising.

SUMMARY OF THE INVENTION

Accordingly, embodiments of the present invention are directed to a mobile terminal and controlling method thereof that substantially obviate one or more problems due to limitations and disadvantages of the related art.

One object of the present invention is to provide a mobile terminal and controlling method thereof, by which an operation of controlling an external mobile terminal is facilitated based on an intuitive gesture of a user.

Advantages obtainable from the present invention are not limited to the above-mentioned object of the invention. Other advantages of the invention can be clearly understood from the following description by those having ordinary skill in the art to which the present invention pertains.

Additional advantages, objects, and features of the invention are set forth in the disclosure as well as the accompanying drawings. Such aspects will be appreciated by those skilled in the art based on the disclosure herein.

To achieve these objects and other advantages and in accordance with the purpose of the invention, as embodied and broadly described herein, a mobile terminal according to one embodiment of the present invention may include a touchscreen, a wireless communication unit configured to transceive data with an external terminal, a sensing unit configured to detect a rotation of the mobile terminal, a user input unit configured to receive an input of a gesture command from a user, and a controller controlling the external terminal in $1^{st}$ operating mode based on the received input of the gesture command, the controller controlling the touchscreen to output at least one control button for controlling the external terminal in $2^{nd}$ operating mode, the controller switching the $1^{st}$ operating mode and the $2^{nd}$ operating mode to each other based on the detected rotation.

In another aspect of the present invention, as embodied and broadly described herein, a method of controlling a mobile terminal according to another embodiment of the present invention may include the steps of receiving an input of a gesture command from a user, controlling an external terminal in $1^{st}$ operating mode based on the received input of the gesture command, controlling a touchscreen to output at least one control button for controlling the external terminal in $2^{nd}$ operating mode, and switching the $1^{st}$ operating mode and the $2^{nd}$ operating mode to each other based on a detected rotation of the mobile terminal.

It is to be understood that both the foregoing general description and the following detailed description of the preferred embodiments of the present invention are exemplary and explanatory and are intended to provide further explanation of the invention as claimed.

BRIEF DESCRIPTION OF THE DRAWINGS

The present invention will become more fully understood from the detailed description given herein below and the accompanying drawings, which are given by illustration only, and thus are not limitative of the present invention, and wherein:

FIG. 14 is a diagram for a control method of inputting a right click command to an external terminal using a finger gesture according to one embodiment of the present invention;

FIG. 17 is a diagram for a control method of changing a type of a laser pointer based on a gesture according to one embodiment of the present invention;

FIG. 25 and FIG. 26 are diagrams for a control method of distinguishing left/right click using a sound/pattern of tapping at a floor with a finger according to one embodiment of the present invention;

FIG. 32 is a diagram for a control method of selecting a prescribed external terminal from a plurality of external terminals according to one embodiment of the present invention;

FIG. 33 is a diagram for switching a mode in a TV designated state according to one embodiment of the present invention;

FIG. 34 is a diagram for switching a mode in an air conditioner designated state according to one embodiment of the present invention;

FIG. 35 and FIG. 36 are diagrams of functions applicable to each external terminal and gestures for applying the corresponding functions;

FIG. 38 is a diagram for a control method of outputting a guide indicator in a state that an air conditioner 3302 is designated according to one embodiment of the present invention.

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
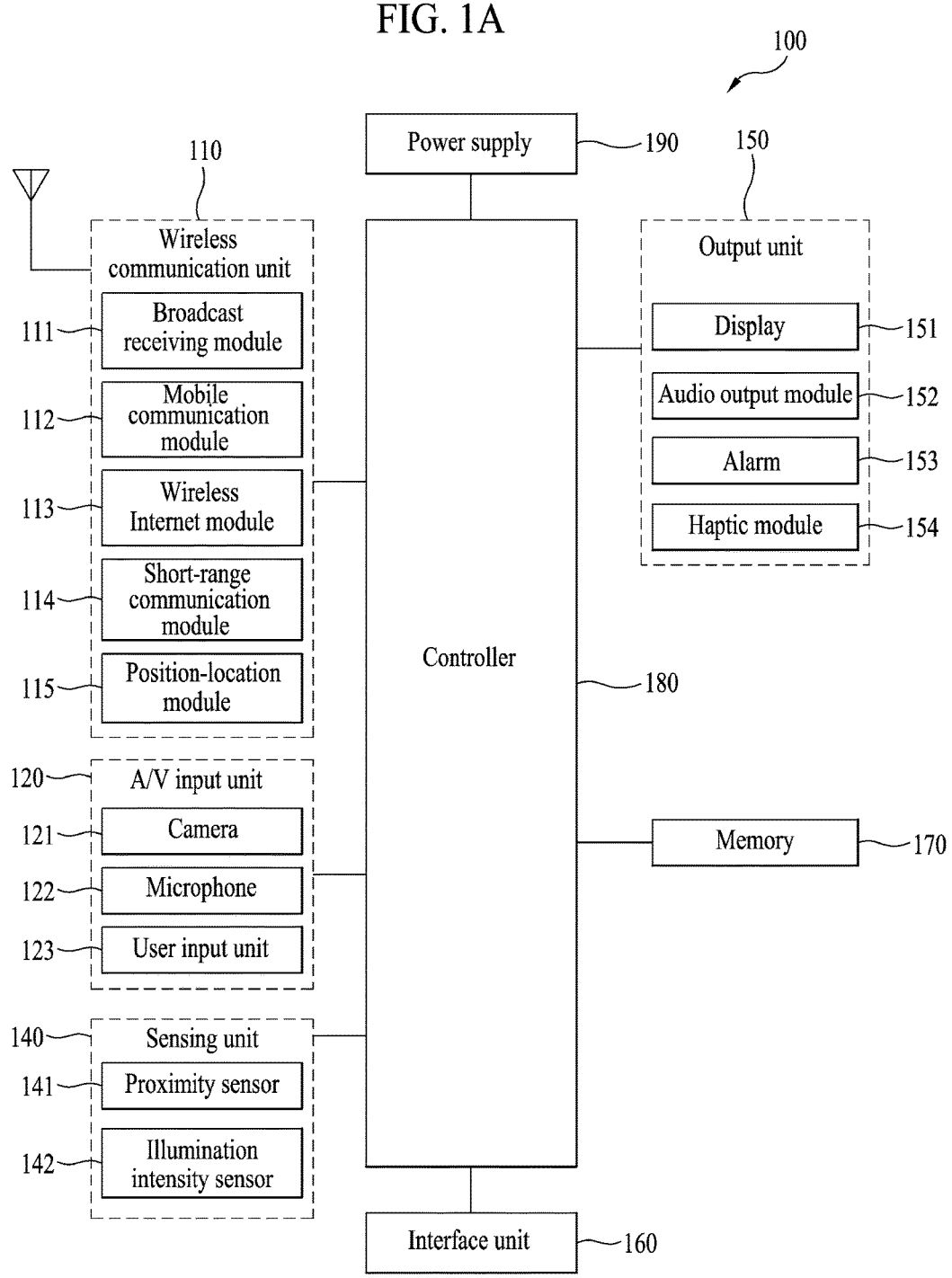
FIG. 1A is a block diagram of a mobile terminal in accordance with the present disclosure.
Figure 1B:
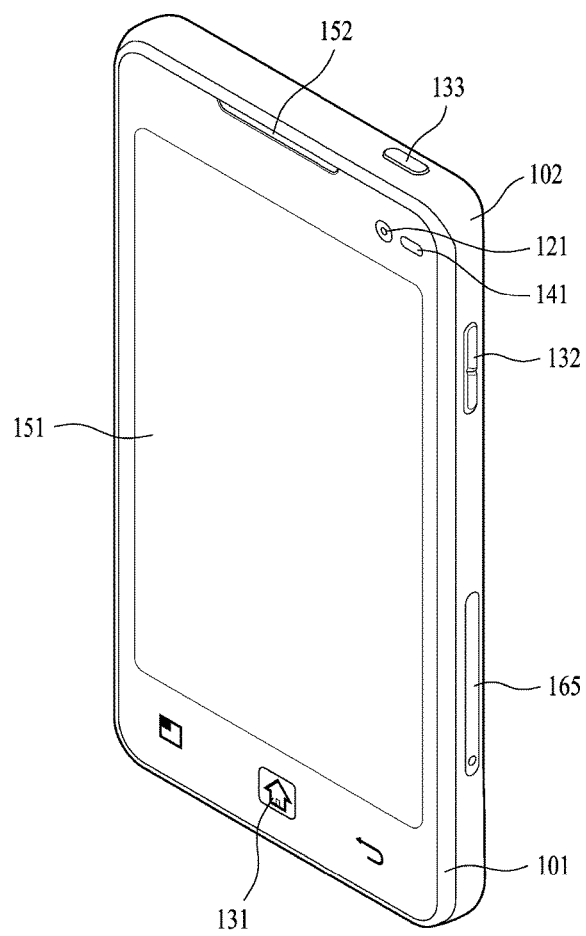
FIGS. 1B and 1C are conceptual views of one example of the mobile terminal, viewed from different directions.
Figure 1C:
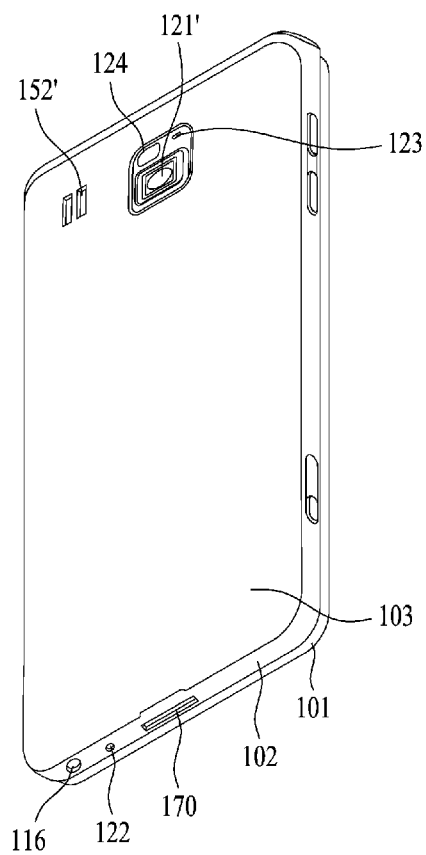

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented. Referring now to FIG. 1A, the mobile terminal 100 is shown having wireless communication unit 110 configured with several commonly implemented components.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 processes signals, data, informations and the like inputted or outputted through the above-mentioned components and/or runs application programs saved in the memory 170, thereby processing or providing a user with appropriate informations and/or functions.

The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIG. 1A according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least one portion of the respective components mentioned in the foregoing description can cooperatively operate to embody operations, controls or controlling methods of the mobile terminal according to various embodiments of the present invention mentioned in the following description. Moreover, the operations, controls or controlling methods of the mobile terminal can be embodied in the mobile terminal by running at least one or more application programs saved in the memory 170.

Referring still to FIG. 1A, various components depicted in this figure will now be described in more detail.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others. As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal.

In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may be provided with the display unit 151, the $1^{st}$ audio output unit 152a, the $2^{nd}$ audio output unit 152b, the proximity sensor 141, the illumination sensor 142, the light output unit 154, the $1^{st}$ camera 121a, the $2^{nd}$ camera 121b, the $1^{st}$ manipulating unit 123a, the $2^{nd}$ manipulating unit 123b, the microphone 122, the interface unit 160, and the like.

FIGS. 1B and 1C depict certain components as arranged on the mobile terminal.

However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices.

Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160.

Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen. Meanwhile, according to the present invention, it is able to display information processed by the mobile terminal using a flexible display. This is described in detail with reference to the accompanying drawings as follows.

In accordance with still further embodiments, a mobile terminal may be configured as a device which is wearable on a human body. Such devices go beyond the usual technique of a user grasping the mobile terminal using their hand. Examples of the wearable device include a smart watch, a smart glass, a head mounted display (HMD), and the like.

A typical wearable device can exchange data with (or cooperate with) another mobile terminal 100. In such a device, the wearable device generally has functionality that is less than the cooperating mobile terminal. For instance, the short-range communication module 114 of a mobile terminal 100 may sense or recognize a wearable device that is near-enough to communicate with the mobile terminal. In addition, when the sensed wearable device is a device which is authenticated to communicate with the mobile terminal 100, the controller 180 may transmit data processed in the mobile terminal 100 to the wearable device via the short-range communication module 114, for example. Hence, a user of the wearable device can use the data processed in the mobile terminal 100 on the wearable device. For example, when a call is received in the mobile terminal 100, the user can answer the call using the wearable device. Also, when a message is received in the mobile terminal 100, the user can check the received message using the wearable device.

Figure 2:
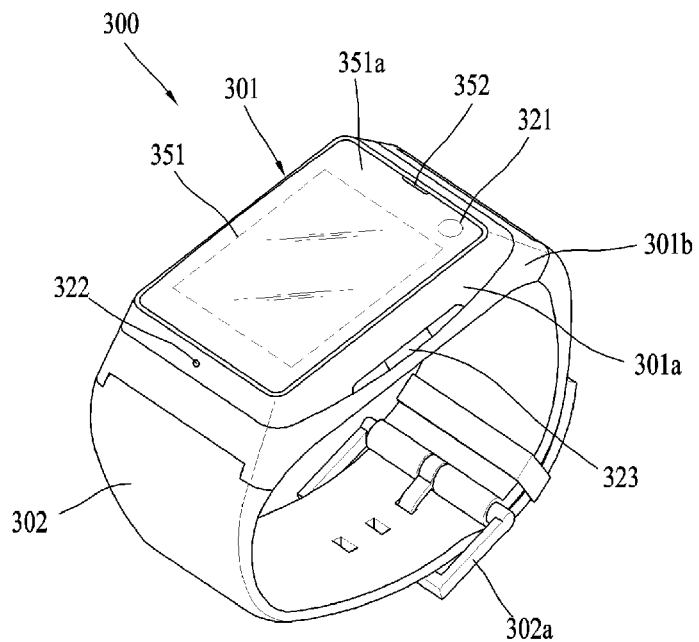
FIG. 2 is a conceptual view of a wearable mobile terminal according to another alternative embodiment of the present disclosure.

FIG. 2 is a perspective view illustrating one example of a watch-type mobile terminal 300 in accordance with another exemplary embodiment.

As illustrated in FIG. 2, the watch-type mobile terminal 300 includes a main body 301 with a display unit 351 and a band 302 connected to the main body 301 to be wearable on a wrist. In general, mobile terminal 300 may be configured to include features that are the same or similar to that of mobile terminal 100 of FIGS. 1A-1C.

The main body 301 may include a case having a certain appearance. As illustrated, the case may include a first case 301a and a second case 301b cooperatively defining an inner space for accommodating various electronic components. Other configurations are possible. For instance, a single case may alternatively be implemented, with such a case being configured to define the inner space, thereby implementing a mobile terminal 300 with a uni-body.

The watch-type mobile terminal 300 can perform wireless communication, and an antenna for the wireless communication can be installed in the main body 301. The antenna may extend its function using the case. For example, a case including a conductive material may be electrically connected to the antenna to extend a ground area or a radiation area.

The display unit 351 is shown located at the front side of the main body 301 so that displayed information is viewable to a user. In some embodiments, the display unit 351 includes a touch sensor so that the display unit can function as a touch screen. As illustrated, window 351a is positioned on the first case 301a to form a front surface of the terminal body together with the first case 301a.

The illustrated embodiment includes audio output module 352, a camera 321, a microphone 322, and a user input unit 323 positioned on the main body 301. When the display unit 351 is implemented as a touch screen, additional function keys may be minimized or eliminated. For example, when the touch screen is implemented, the user input unit 323 may be omitted.

The band 302 is commonly worn on the user's wrist and may be made of a flexible material for facilitating wearing of the device. As one example, the band 302 may be made of fur, rubber, silicon, synthetic resin, or the like. The band 302 may also be configured to be detachable from the main body 301. Accordingly, the band 302 may be replaceable with various types of bands according to a user's preference.

In one configuration, the band 302 may be used for extending the performance of the antenna. For example, the band may include therein a ground extending portion (not shown) electrically connected to the antenna to extend a ground area.

The band 302 may include fastener 302a. The fastener 302a may be implemented into a buckle type, a snap-fit hook structure, a Velcro® type, or the like, and include a flexible section or material. The drawing illustrates an example that the fastener 302a is implemented using a buckle.

Further preferred embodiments will be described in more detail with reference to additional drawing figures. It is understood by those skilled in the art that the present features can be embodied in several forms without departing from the characteristics thereof.

According to one embodiment of the present invention, proposed is a method of controlling an external terminal more intuitively and effectively using a mobile terminal 300 of a watch type. Hereinafter, the mobile terminal 300 of the watch type shall be named a watch terminal 300. On example of the external terminal may include one of a PC, a laptop, an air conditioner, a refrigerator and the like handed in the accompanying drawings, by which the external terminal is non-limited. Particularly, it is proposed to designate a mobile terminal to control using a rotation of the watch terminal 300. This designating method can help to designate an external, which is to be controlled, when a plurality of external terminals exist. Moreover, if operations in a plurality of modes including a $1^{st}$ operating mode for controlling an external terminal, a $2^{nd}$ operating mode (or, a mode of having a button for controlling an external terminal) for controlling a function of a watch terminal 300 itself and the like are possible, it is advantageous in that the operating modes can be intuitively switched to each other. This is described in detail with reference to the accompanying drawing as follows.

Figure 3:
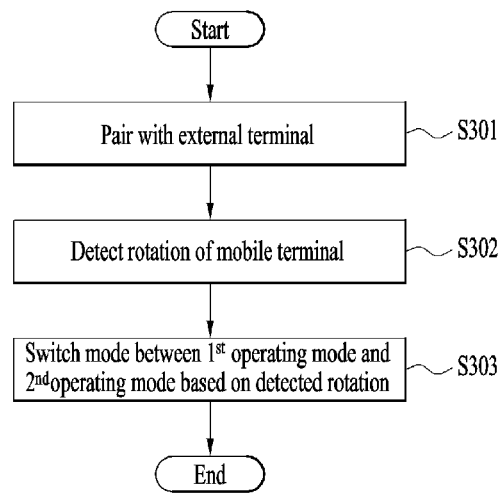
FIG. 3 is a flowchart for a control method of detecting a rotation of a watch terminal 300 and then switching one operating mode to another operating mode based on a result of the detection according to one embodiment of the present invention.

FIG. 3 is a flowchart for a control method of detecting a rotation of a watch terminal 300 and then switching one operating mode to another operating mode based on a result of the detection according to one embodiment of the present invention.

Referring to FIG. 3, in a step S301, the controller 180 is paired with at least one external terminal. In this case, since the paring just means a state that a preset procedure for enabling data to be transceived with an external terminal has been performed, embodiments of the present invention shall not be limited by the terminology 'paring (or paired)'.

Particularly, according to one embodiment of the present invention, a state that a pairing with a prescribed external terminal has been performed is entered. Yet, a state that a pairing with a plurality of external terminals has been performed may be entered.

In a step S302, the controller 180 can detect a rotation of the watch terminal 300.

Using a result of the detected rotation, it is able to switch operating modes to each other or to designate an external terminal to control among a plurality of paired external terminals.

In particular, according to one embodiment of the present invention, it is able to switch modes to each other or to designate a specific external terminal depending on a fact that a specific axis of the watch terminal 300 faces a prescribed direction as well as to simply detect an angle of the rotation of the watch terminal 300. For instance, a laser pointer is provided to a prescribed location on the watch terminal 300. An external terminal indicated by the laser pointer can be designated. If the laser pointer faces a prescribed region, a $1^{st}$ operating mode can be entered. If the laser pointer faces another region, a $2^{nd}$ operating mode can be entered. The laser pointer provided configuration shall be described in detail with reference to FIG. 4 as follows. Moreover, the laser pointer may be activated or deactivated automatically in response to an inter-mode switching.

Figure 4:
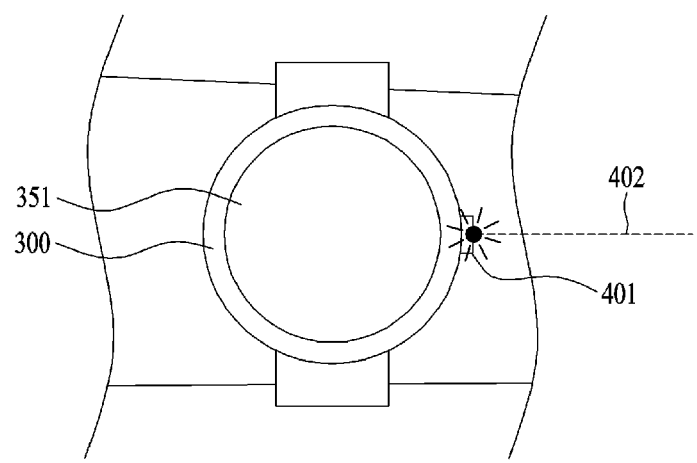
FIG. 4 is a diagram for one example of a laser pointer provided according to one embodiment of the present invention.

FIG. 4 is a diagram for one example of a laser pointer provided according to one embodiment of the present invention.

Referring to FIG. 4, according to one embodiment of the present invention, it is proposed to provide a laser pointer 401 to a stem of a watch terminal 300. Although a stem of a general watch is used to adjust an hour or date, various control inputs can be performed through rotations of the stem of the watch terminal 300. When the watch terminal 300 is worn, the stem of the watch terminal 300 is generally provided in a hand direction for facilitation of use. For the facilitation in using the laser pointer, it is necessary for an applied direction of a laser 402 to be the same direction.

According to another embodiment of the present invention, the laser pointer may not be provided. Such an embodiment shall be described in detail later.

The laser pointer is generally used to point at a specific point on a screen in giving a presentation. If the laser pointer faces a location (particularly, audience) other than the screen, it is preferable that the laser is not shot. The reason for this is that applying a laser beam to human eyes in direct may cause the failing of eyesight or the loss of sight. Hence, according to one embodiment of the present invention, a following operation is proposed. First of all, a location of a screen is determined. Secondly, a case of facing the determined location of the screen is distinguished from a case of failing to face the determined location of the screen. In particular, a $1^{st}$ operating mode (hereinafter named a direct control mode) for performing a function of activating a laser pointer, a function of outputting a control cursor to a screen, a function of controlling a screen outputted through a screen and the like in case of facing a screen region is proposed to be distinguished from a $2^{nd}$ operating mode (hereinafter named a remote mode) for controlling an external terminal using a button outputted through a touchscreen 351 of a watch terminal 300 in case of facing a region other than the screen region.

Such an embodiment is described in detail with reference to FIG. 5 and FIG. 6 as follows.

Figure 5:
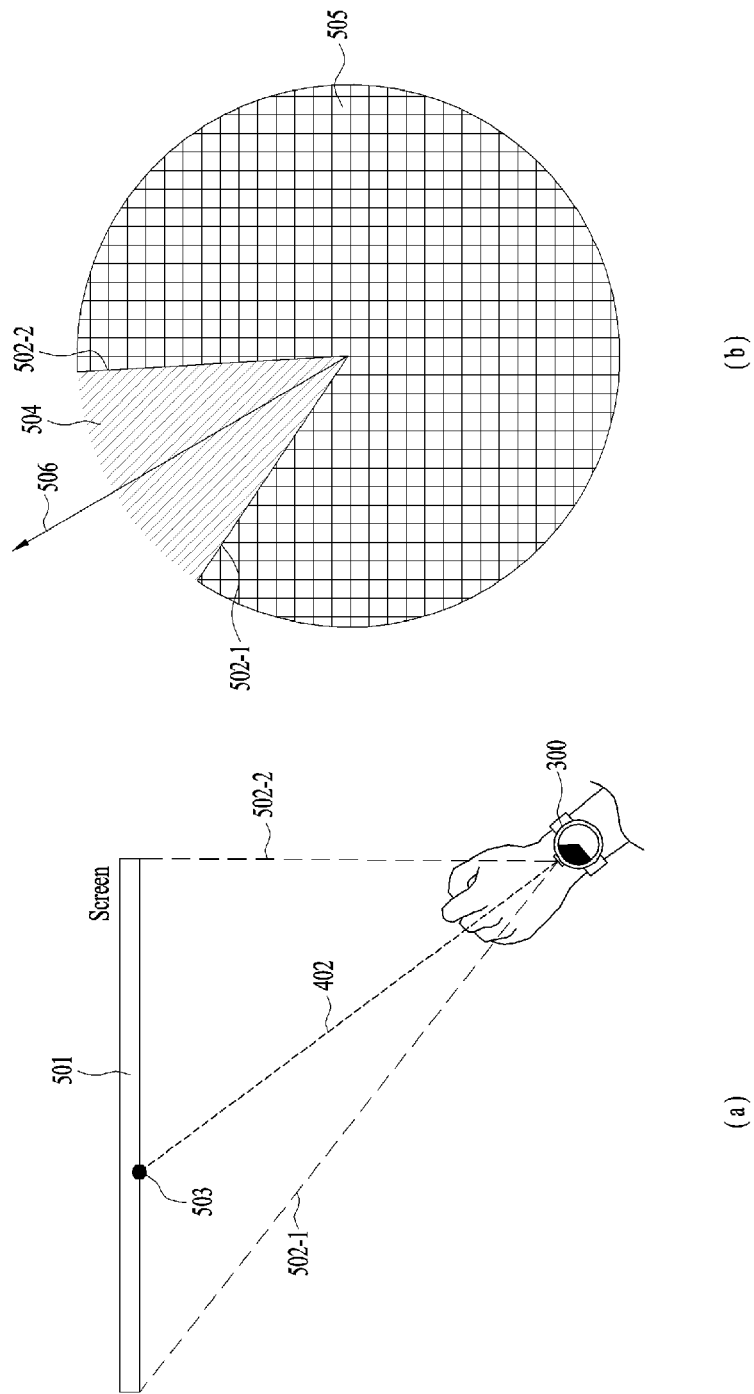
FIG. 5 and FIG. 6 are diagrams for a control method of determining a location of a screen based on a rotational angle of a watch terminal 300 according to one embodiment of the present invention.
Figure 6:
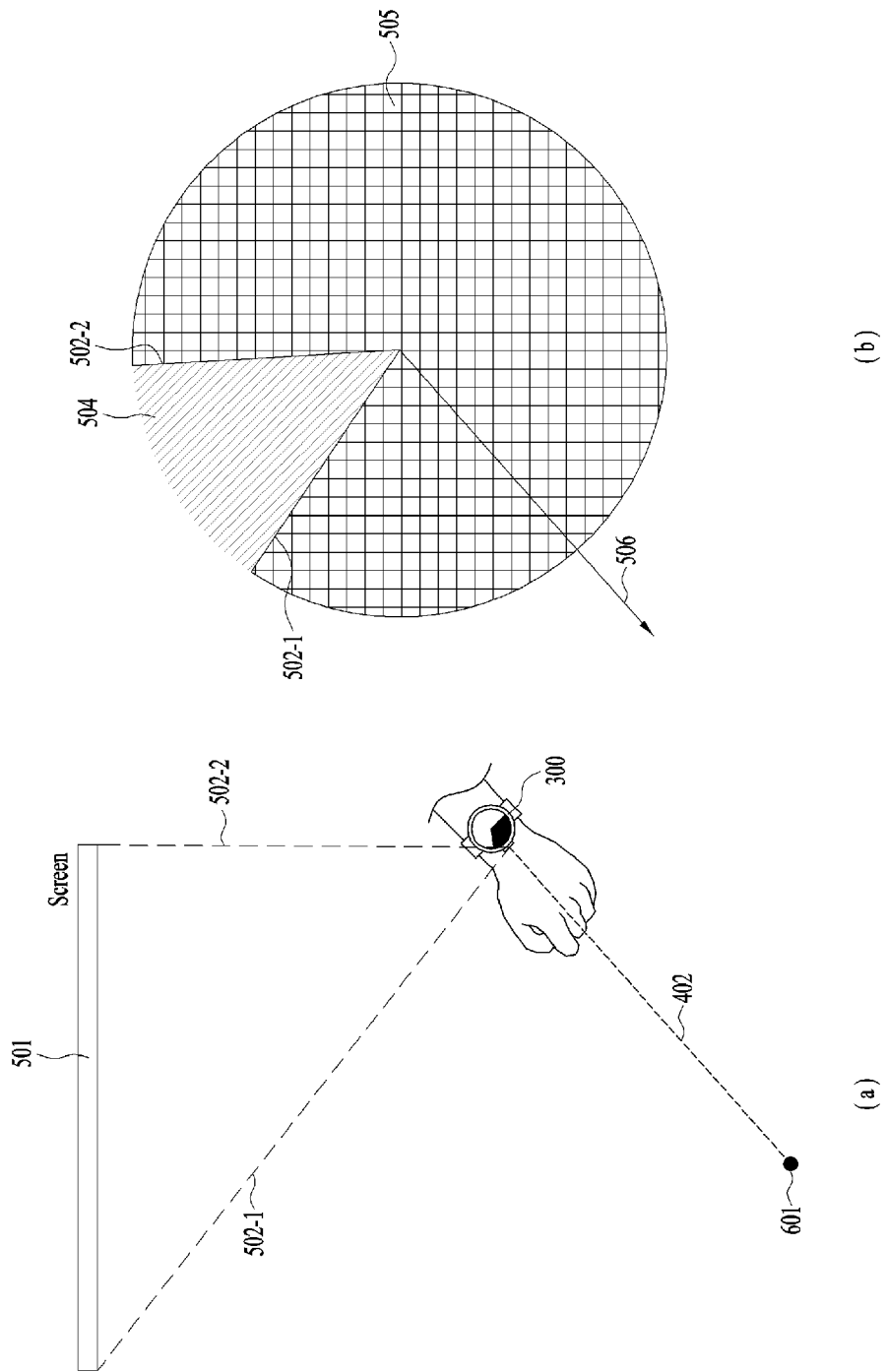

FIG. 5 and FIG. 6 are diagrams for a control method of determining a location of a screen based on a rotational angle of a watch terminal 300 according to one embodiment of the present invention.

Referring to FIG. 5 (a), a laser 402 is currently applied toward a prescribed point 503 of a screen 501. If a watch terminal 300 is able to determine a screen ending point, when the watch terminal 300 is rotated over the screen ending point, it may be able to deactivate a laser pointer. In particular, as the watch terminal 300 is rotated, if a direction of applying the laser 402 deviates from a boundary 502-1 or 502-2 of a direction of the screen 501, the controller 180 is able to deactivate the laser pointer.

FIG. 5 (b) is a conceptional diagram to indicate a boundary in response to a rotation of a reference axis of the watch terminal 300. The watch terminal 300 may be able to detect a rotation in a direction 506 faced by the reference axis (e.g., a direction of applying the laser 402). The watch terminal 300 may be able to actually operate using such a reference axis but may become a conceptional reference only.

If the laser 402 is rotated to face a region between the two boundaries 502-1 and 502-2 shown in FIG. 5 (a), the reference axis direction 506 shown in FIG. 5 (b) may be located in an activated region 504. In particular, by detecting the rotation of the watch terminal 300, it may be able to whether the reference axis direction 506 faces the screen. If the reference axis direction 506 is determined as facing the screen, the watch terminal 300 can activate the laser pointer. A control method of setting an activated region 504 and a deactivated region 505 shall be described in detail with reference to FIG. 7 and FIG. 8 later.

In the following description, a case of pointing at a point other than a screen is described in detail with reference to FIG. 6.

As mentioned in the foregoing description, a laser should not be shot from a laser pointer toward audience. Therefore, according to one embodiment of the present invention, as shown in FIG. 6, if a laser pointer deviates from a screen, it is able to deactivate the laser pointer.

Referring to FIG. 6 (a), a laser 402 is currently applied toward a prescribed point 601 other than a screen 501. As a watch terminal 300 is rotated, if a direction of applying the laser 402 deviates from a boundary 502-1 or 502-2 of a direction of the screen 501, as shown in the drawing, the controller 180 is able to deactivate a laser pointer.

Like FIG. 5 (*b*), FIG. 6 (*b*) is a conceptional diagram to indicate a boundary in response to a rotation of a reference axis of the watch terminal 300. The watch terminal 300 may be able to detect a rotation in a direction 506 faced by the reference axis.

If the laser 402 is rotated to face a region outside the two boundaries 502-1 and 502-2 shown in FIG. 6 (*a*), the reference axis direction 506 shown in FIG. 6 (*b*) may be located in a deactivated region 505. If the reference axis direction 506 is determined as not facing the screen, the watch terminal 300 can deactivate the laser pointer.

A method of setting rotation boundaries 502-1 and 502-2 for automatically rotating a laser, i.e., a method of designating an activated/deactivated region is described in detail with reference to FIG. 7 and FIG. 8 as follows.

Figure 7:
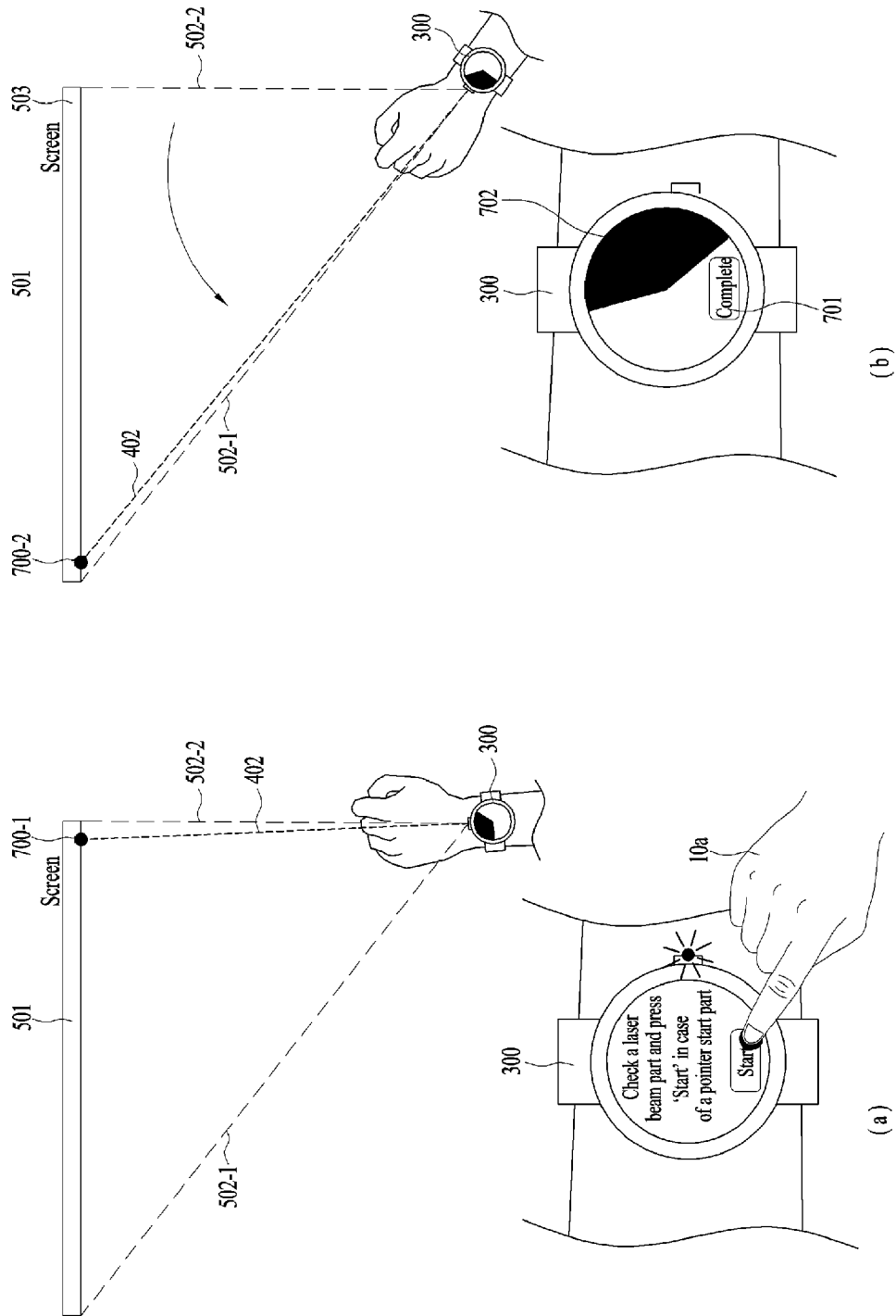
FIG. 7 is a diagram for a method of designating an activated region according to a $1^{st}$ embodiment of the present invention.

FIG. 7 is a diagram for a method of designating an activated region according to a $1^{st}$ embodiment of the present invention.

According to an embodiment related to FIG. 7, it is proposed that a user designates start and end points of an activated region by rotating a watch terminal 300.

Referring to FIG. 7 (*a*), a user designates a start point of a region. In particular, when a laser 402 is applied to a right boundary 700-1 of a screen 501, a user is able to designate a $1^{st}$ boundary 502-2 by applying a touch 10*a* to a start button.

As a watch terminal 300 is rotated, when the laser 402 is applied to a left boundary 700-2 of the screen 501, the user can designate a $2^{nd}$ boundary 502-1 by touching a complete button 701.

According to one embodiment of the present invention, referring to FIG. 7 (*b*), the watch terminal 300 can further display a rotation radius indicator 702 indicating a radius of rotation of the watch terminal 300 from the $1^{st}$ boundary 502-2. It will be convenient and easy for the user to check a size of a set region by watching the rotation radius indicator 702.

Figure 8:
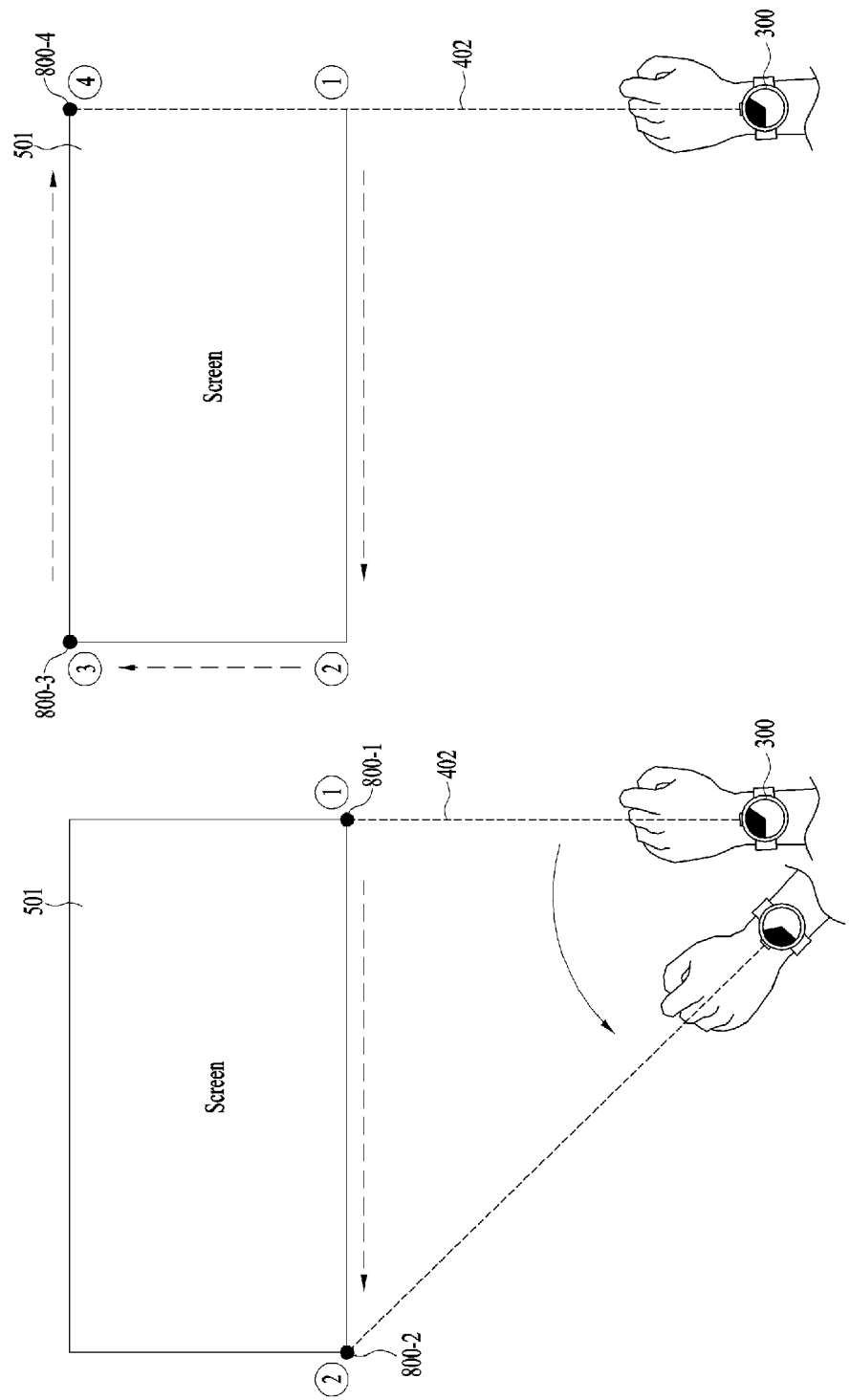
FIG. 8 is a diagram for a method of designating an activated region according to a $2^{nd}$ embodiment of the present invention.

FIG. 8 is a diagram for a method of designating an activated region according to a $2^{nd}$ embodiment of the present invention.

Referring to FIG. 8, it is proposed to consider a 3-dimensional (3D) rotation, whereas a rotation radius in a 2-dimensional (2D) plane is considered only. In particular, it is proposed to designate top and bottom boundaries as well as the right and left boundaries. This is described in detail with reference to the accompanying drawing as follows.

FIG. 8 (*a*) and FIG. 8 (*b*) show a control method of designating a screen region in front view of a screen 501. If a user designates 4 corners, the controller 180 may be able to set an activated region to an inside enclosed by the designated 4 corners.

Referring to FIG. 8 (*a*), if the user points a laser 402 at a $1^{st}$ corner 800-1 and then moves the laser 402 to a $2^{nd}$ corner 800-2 by rotating a watch terminal 300, the controller 180 is able to recognize the $1^{st}$ corner 800-1 and the $2^{nd}$ corner 800-2 in turn. Subsequently, referring to FIG. 8 (*b*), if the user moves the laser to point at a $3^{rd}$ corner 800-3 and a $4^{th}$ corner 800-4 in turn, the controller 180 may be able to recognize the $3^{rd}$ corner 800-3 and the $4^{th}$ corner 800-4. Having recognized the $1^{st}$ to $4^{th}$ corners 800-1 to 800-4, the controller 180 may be able to set an activated region to an inside enclosed by the corners.

Moreover, according to one embodiment of the present invention, as a location of a user is moved, although a relative location of a screen is changed, it is proposed to automatically change an activated region using the changed relative location. Such an embodiment is described in detail with reference to FIG. 9 as follows.

Figure 9:
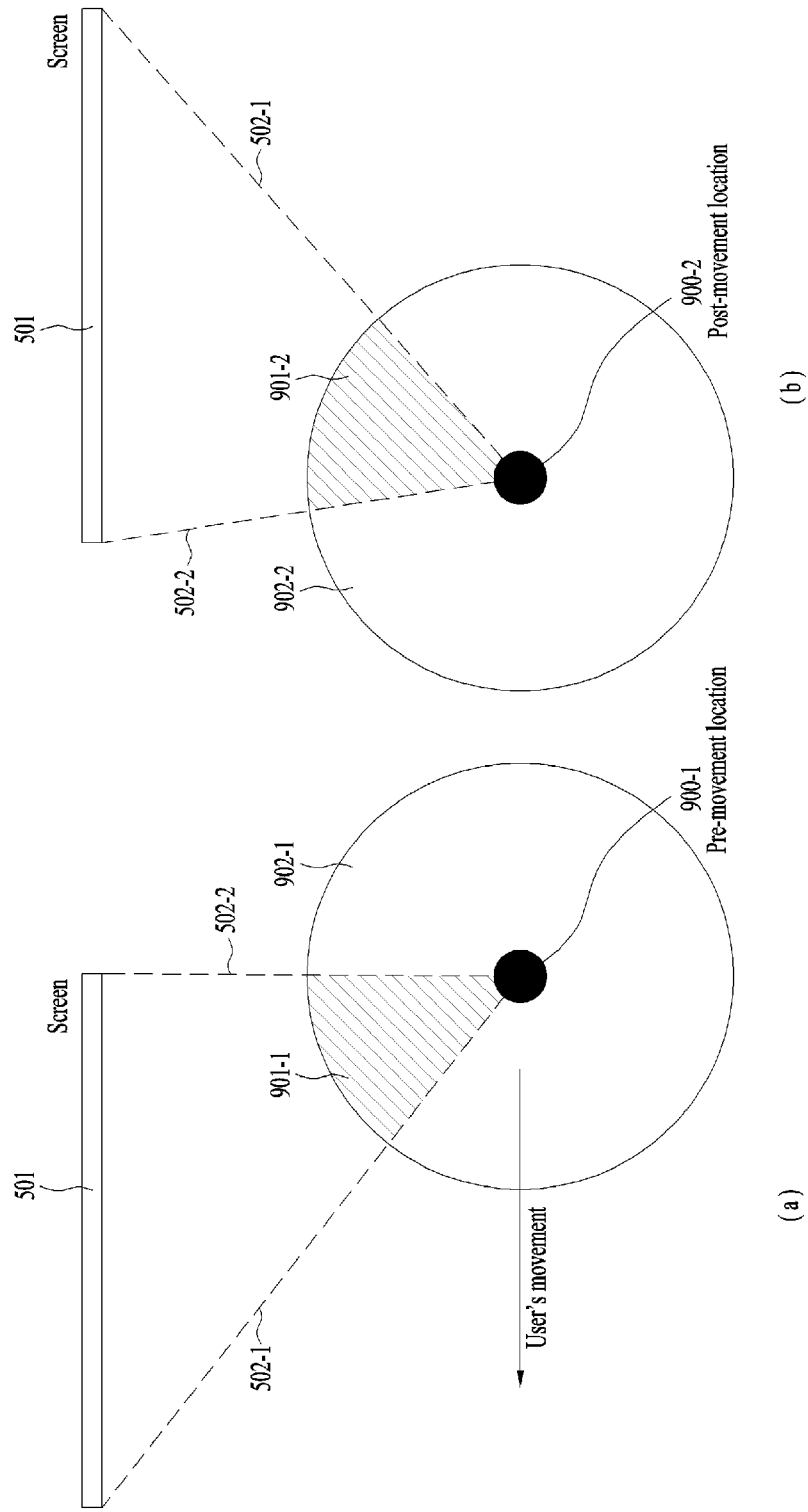
FIG. 9 is a diagram for a control method of changing an activated region in response to a movement of a user location according to one embodiment of the present invention.

FIG. 9 is a diagram for a control method of changing an activated region in response to a movement of a user location according to one embodiment of the present invention.

FIG. 9 (*a*) is a conceptional diagram of an activated region 901-1 and a deactivated region 902-1 set at a pre-movement location 900-1.

Generally, a presenter gives a presentation by freely moving in front of a screen. If the presenter sets an activated region each time, it may be inconvenient. Hence, according to one embodiment of the present invention, it is proposed to automatically change an activated region to fit a moved location.

If a location shown in FIG. 9 (*a*) is moved to a location 900-2 shown in FIG. 9 (*b*), a post-movement activated region 901-2 and a post-movement deactivated region 902-2 are set. In particular, the watch terminal 300 detects a moving direction of a user and a moving distance of the user through the sensing unit 140 and may be then able to calculate a relative location change of the screen using a result of the detection. If the change of the relative location is changed, a location of the activated region may be reset automatically.

According to the above-described embodiment, after an activated region and a deactivated region have been set in accordance with a rotation of the watch terminal 300, it is proposed to control activation of a laser pointer automatically in accordance with the setting. On the other hand, according to another embodiment of the present invention, it is proposed to controls an activation of a laser pointer in response to a user's control command.

According to one embodiment of the present invention, the sensing unit 140 of the watch terminal 300 is proposed to detect whether a user closes or opens a fist. In particular, when a user wears the watch terminal 300 on a wrist of one of his hands, the sensing unit 140 is able to detect a case of closing a fist with the corresponding hand or a case of opening a list with the corresponding hand. One example of the sensing unit 140 configured to detect such cases may include a blood flow rate detecting sensor. When a user closes a fist, a blood flow rate in a hand direction is reduced. If the blood flow rate is detected through the watch terminal 300 worn on the wrist, it is able to detect whether the user closes or opens a fist by detecting such a change of the blood flow rate.

Another example of the sensing unit 140 configured to detect the cases may include a muscle detecting sensor. A configuration of muscles of a user's wrist may be changed in response to a case of closing or opening a fist. If the configuration of muscles of the wrist is detected through the watch terminal 300 worn on the wrist, it is able to detect whether the user closes or opens a fist by detecting such a change of the configuration of muscles.

According to one embodiment of the present invention, it is proposed to activate a laser pointer depending on whether a user closes or opens a fist using one of the above-mentioned methods.

For instance, if a user opens a fist, the controller 180 can control activation of a laser pointer. For another instance, if a user closes a fist, the controller 180 can control deactivation of a laser pointer.

Figure 10:
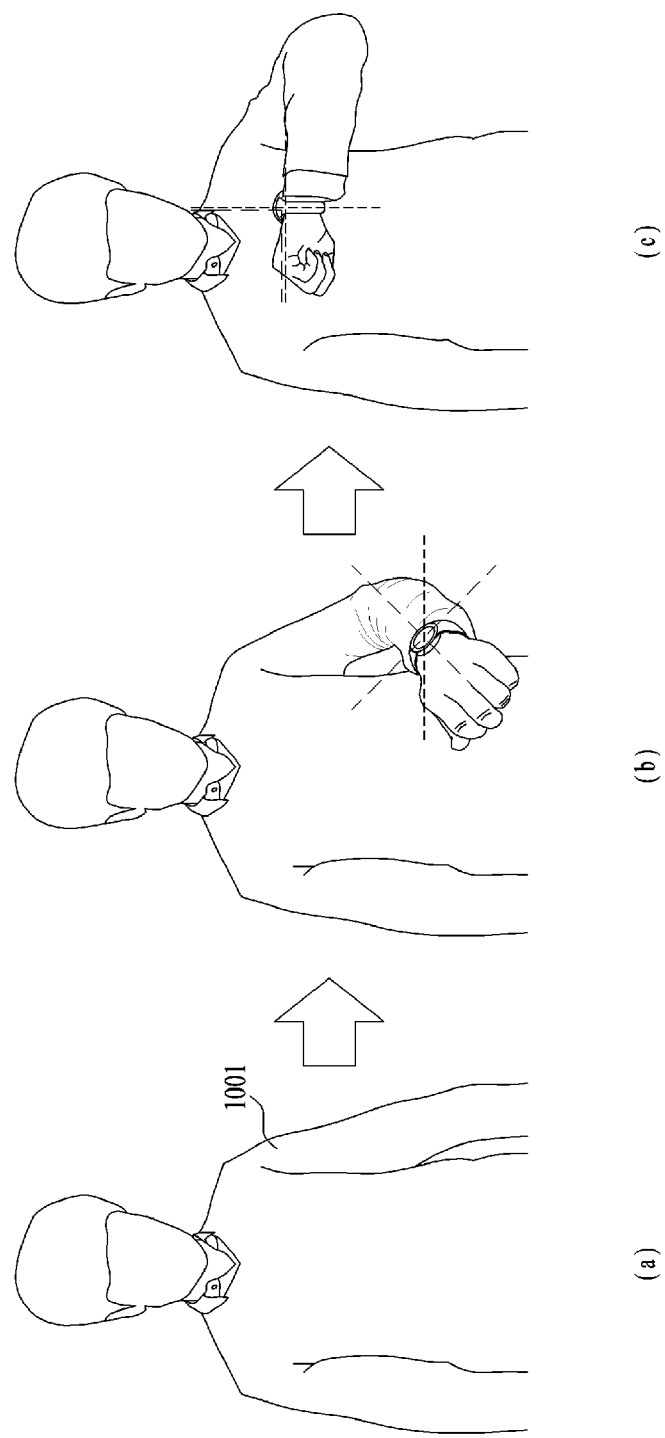
FIG. 10 is a diagram for another example of switching a mode manually according to one embodiment of the present invention.

FIG. 10 is a diagram for another example of switching a mode manually according to one embodiment of the present invention. According to an embodiment related to FIG. 10, if a user takes a gesture of checking a watch terminal 300, it is proposed to perform a switching between operating modes.

Referring to FIG. 10 (a), while a user wears the watch terminal 300, the user currently takes a comfortable posture (e.g., a posture of lowering an arm 1001 having the watch terminal 300 worn thereon). In doing so, if the user takes a gesture of checking the touchscreen 351 of the watch terminal 300 [FIG. 10 (c)] by raising the arm 1001 slowly [FIG. 10 (b)], the controller 180 can control a $1^{st}$ mode to be switched to a $2^{nd}$ mode.

For instance, while a laser pointer is in an activated state, if the above-mentioned gesture is detected, the activated state of the laser pointer can be switched to a deactivated state.

The above-mentioned gesture may be determined based on each change pattern received through the gyroscope sensor provided to the sensing unit 140 of the watch terminal 300, by which the present embodiment may be non-limited.

According to one embodiment of the present invention, it is proposed to control a feedback in accordance with an operating mode by fastening or unfastening a band 302. Such an embodiment is described in detail with reference to FIG. 11 as follows.

Figure 11:
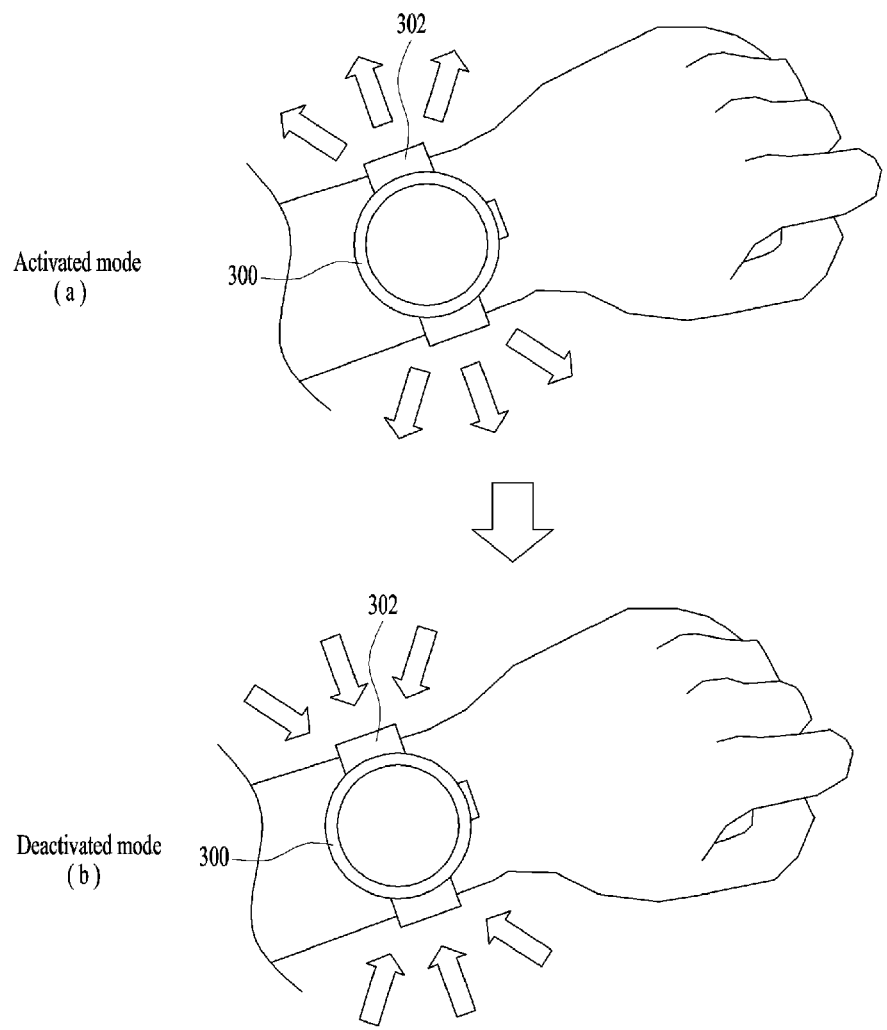
FIG. 11 is a diagram for an inter-mode switching feedback control method according to one embodiment of the present invention.

FIG. 11 is a diagram for an inter-mode switching feedback control method according to one embodiment of the present invention.

According to one embodiment of the present invention, an inter-mode switching is performed manually or automatically. Hence, a feedback indicating whether the switching is correctly performed is requested. Hence, according to one embodiment of the present invention it is proposed to give the feedback by controlling a fastening of the band 302.

Referring to FIG. 11 (a), if an activated mode is entered, the controller 180 controls the band 302 to be unfastened.

On the other hand, referring to FIG. 11 (b), if a deactivated mode is entered, the controller 180 controls the band 302 to be fastened.

Hence, depending on how much the band 302 is fastened, it is advantageous in that a user can determine which mode is entered for the corresponding operation.

A method of controlling a laser pointer according to one embodiment of the present invention is described in detail with reference to FIGS. 12 to 18 as follows.

Figure 12:
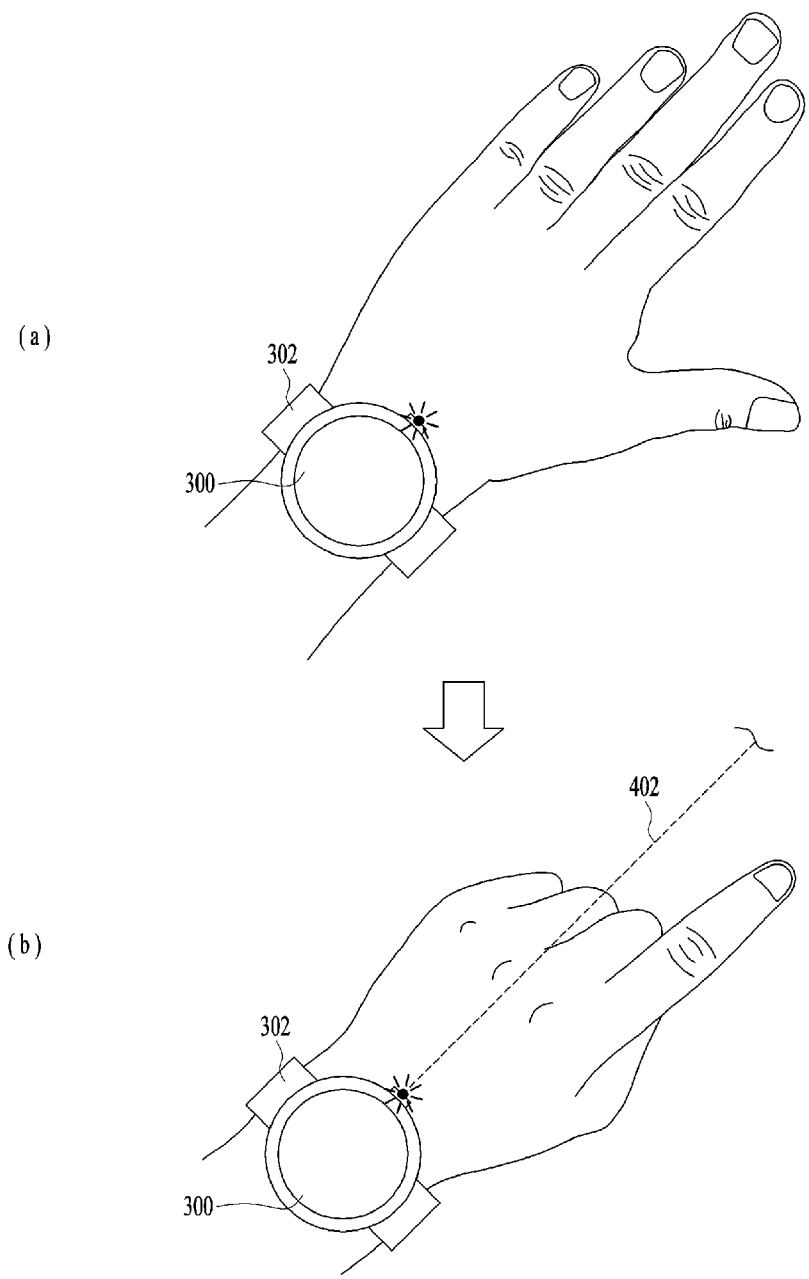
FIG. 12 is a diagram for a control method of activating a laser pointer according to one embodiment of the present invention.

FIG. 12 is a diagram for a control method of activating a laser pointer according to one embodiment of the present invention.

According to the above-described embodiment, it is proposed that the laser pointer is automatically activated in response to a rotation of the watch terminal 300. On the other hand, according to an embodiment in the following description, it is proposed to switch an operating mode only. In particular, although a laser pointer can operate in $1^{st}$ operating mode (i.e., direct control mode) in response to a control command according to one of FIGS. 12 to 18, the laser pointer may not operate in $2^{nd}$ operating mode (i.e., remote mode) in response to the control command. In more particular, for example, if a user rotates the watch terminal 300 to face a screen direction, it is able to control activation/deactivation of the laser pointer. Yet, if the watch terminal faces an audience direction, it is proposed that the control of the laser pointer becomes impossible. Instead, it may be able to provide different functions other than the control of the laser pointer. The different functions shall be described in detail later.

FIG. 12 (a) is a diagram of a state that a user opens a fist in $1^{st}$ operating mode switched by a rotation of the watch terminal 300 according to one embodiment of the present invention. In the $1^{st}$ operating mode, if a user takes a gesture (cf. FIG. 12 (b)) of indicating by unfolding a prescribed finger (e.g., an index finger, etc.), the controller 180 is proposed to activate the laser pointer. In particular, it is proposed to control the activation of the laser pointer by an intuitive gesture using a hand having the watch terminal 300 worn thereon.

A user's gesture of folding or unfolding finger(s) may be detected by the sensing unit 140. Like the above-mentioned gesture of closing/opening a fist, a change of a blood flow rate or muscle, which varies on unfolding or folding finger(s) using the blood flow rate sensor or the muscle sensor, is detected and it is then able to detect a gesture of unfolding or folding the finger(s) using the detection of the change.

According to an embodiment mentioned in the following description, while the watch terminal 300 according to one embodiment of the present invention is connected to an external terminal, it is proposed to control the external terminal by a user's gesture. In particular, it is able to transmit a control signal to the external terminal by the user's gesture.

To this end, the watch terminal 300 may be connected (or paired) with the external terminal in a data communication enabled state.

In the following description, a control command is described in detail with reference to the accompanying drawings.

Figure 13:
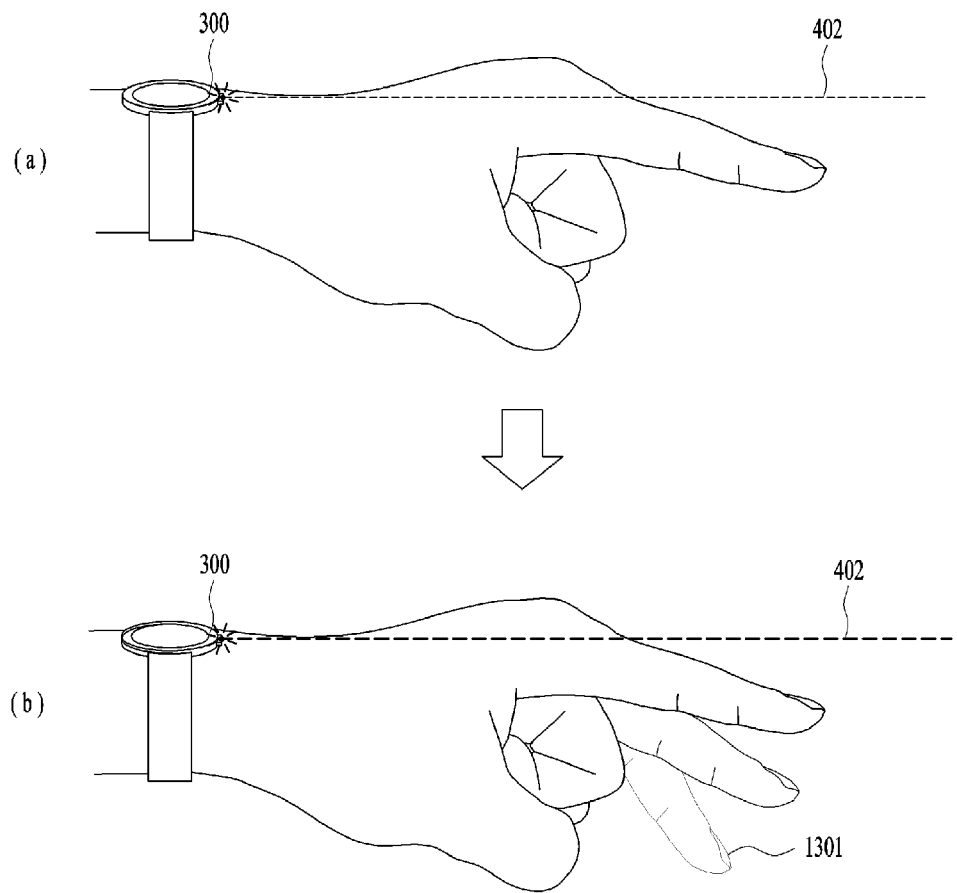
FIG. 13 is a diagram for a control method of inputting a click command to an external terminal using a finger gesture according to one embodiment of the present invention.

FIG. 13 is a diagram for a control method of inputting a click command to an external terminal using a finger gesture according to one embodiment of the present invention.

According to an embodiment related to FIG. 13, it is proposed that a user performs a click of a mouse of a personal computer or laptop connected as an external terminal using a user's gesture of twitching a finger (e.g., an index finger 1301 shown in FIG. 13 (b)).

Particularly, a clicked location is important for a mouse click. According to one embodiment of the present invention, it is proposed to click a location indicated by a laser 402. In particular, the external terminal receives both a clicked location information and a click control signal from the watch terminal 300 and may be then able to perform a mouse click on a place mapped to the corresponding location information based on the received signal.

If the click mentioned in the description of the embodiment with reference to FIG. 13 is mapped to a left click of a mouse, it may be able to perform a right click using another finger.

FIG. 14 is a diagram for a control method of inputting a right click command to an external terminal using a finger gesture according to one embodiment of the present invention.

According to an embodiment related to FIG. 14, it is proposed to transmit a right click control signal using a finger (e.g., a middle finger) other than a finger (e.g., an index finger) used for a left mouse click.

Referring to FIG. 14 (a), a user is inputting a gesture 1401 of twitching a finger using a middle finger. If the finger gesture is detected, the controller 180 can transmit a right click control signal to a location (denoted by a reference number 1402 shown in FIG. 14 (b)) indicated by a laser 402.

Figure 15:
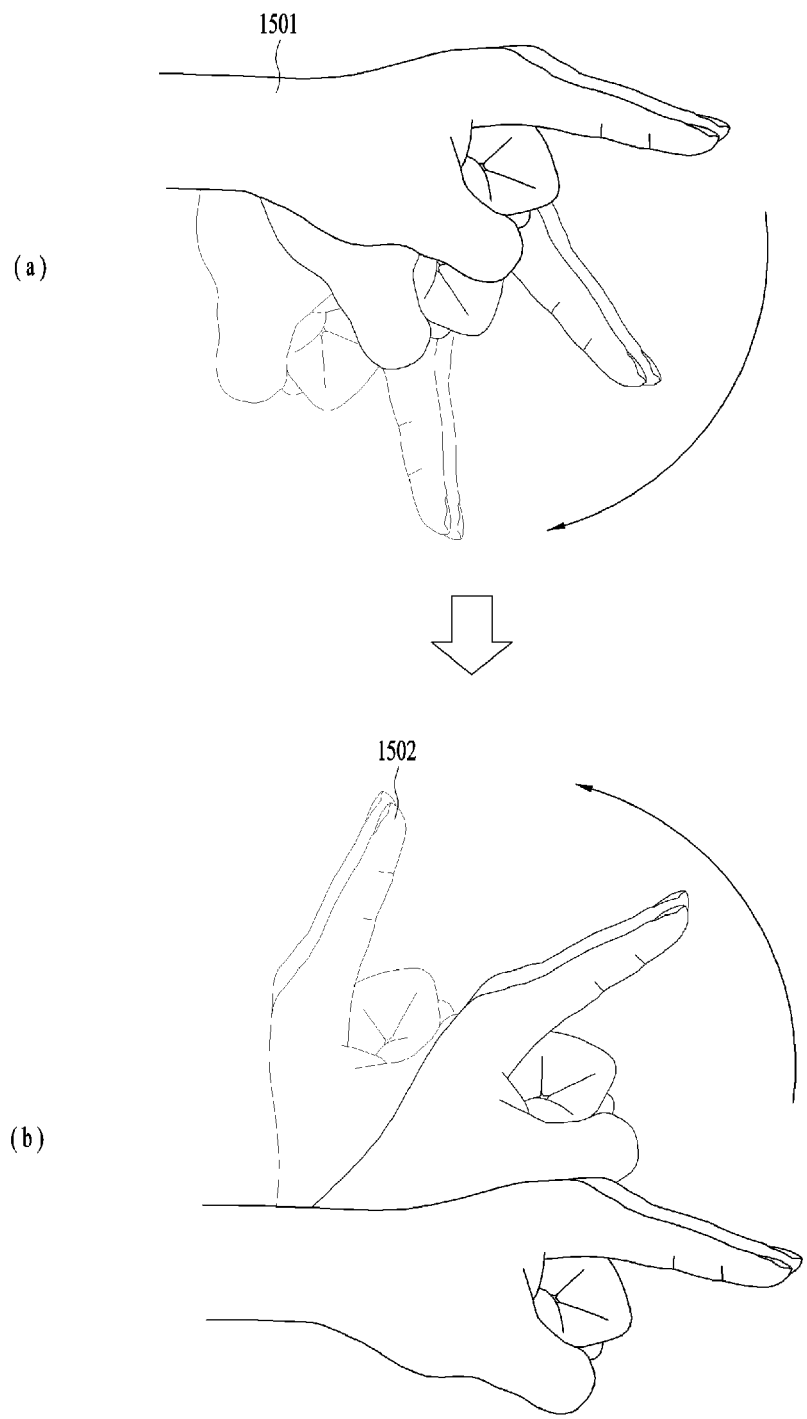
FIG. 15 is a diagram for a control method of inputting a scroll control command to a paired external terminal (e.g., a personal computer, etc.) according to one embodiment of the present invention.

FIG. 15 is a diagram for a control method of inputting a scroll control command to a paired external terminal (e.g., a personal computer, etc.) according to one embodiment of the present invention.

According to an embodiment described with reference to FIG. 15 (a), proposed is a control method of transmitting a scroll-down command to an external terminal using a gesture 1501 of bending a wrist downward by folding two fingers through a hand having the watch terminal 300 worn thereon.

According to an embodiment described with reference to FIG. 15 (*b*), proposed is a control method of transmitting a scroll-up command to an external terminal using a gesture 1502 of bending a wrist upward by folding two fingers through a hand having the watch terminal 300 worn thereon.

Figure 16:
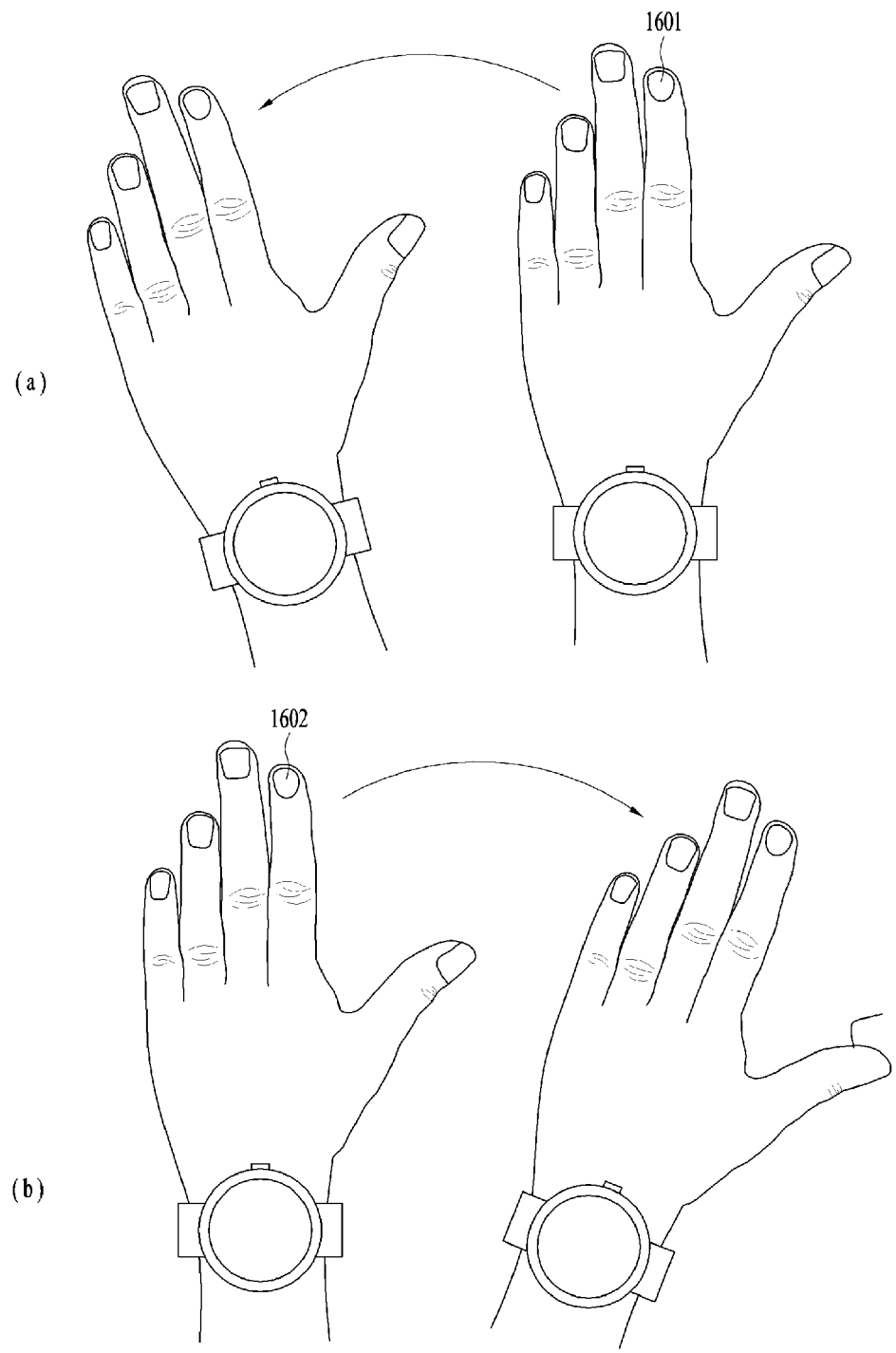
FIG. 16 is a diagram for a control method of inputting a previous/next page command to a paired external terminal (e.g., a personal computer, etc.) according to one embodiment of the present invention.

FIG. 16 is a diagram for a control method of inputting a previous/next page command to a paired external terminal (e.g., a personal computer, etc.) according to one embodiment of the present invention.

According to an embodiment described with reference to FIG. 16 (*a*), proposed is a control method of transmitting a previous page command to an external terminal using a gesture 1601 of pushing left by opening a fist through a hand having the watch terminal 300 worn thereon.

According to an embodiment described with reference to FIG. 16 (*b*), proposed is a control method of transmitting a next page command to an external terminal using a gesture 1601 of pushing right by opening a fist through a hand having the watch terminal 300 worn thereon.

According to one embodiment of the present invention, proposed is a method of changing a type of a laser pointer using a user's gesture only.

FIG. 17 is a diagram for a control method of changing a type of a laser pointer based on a gesture according to one embodiment of the present invention.

Referring to FIG. 17 (*a*) to 17 (*c*), a user currently wears the watch terminal 300 on a wrist. Referring to FIG. 17 (*a*), a laser pointer of a $1^{st}$ type is outputted. If a gesture 1 bending the wrist upward is inputted, the controller 180 detects the inputted gesture 1702 and is then able to change the laser pointer of the $1^{st}$ type into a $2^{nd}$ type [FIG. 17 (*c*)].

For instance, the $2^{nd}$ type includes a highlight type and may include a type of outputting a laser of fluorescent color series. Thus, according to one embodiment of the present invention, it is able to easily switch an output type of a laser pointer using an intuitive and simple gesture of a user.

Figure 18:
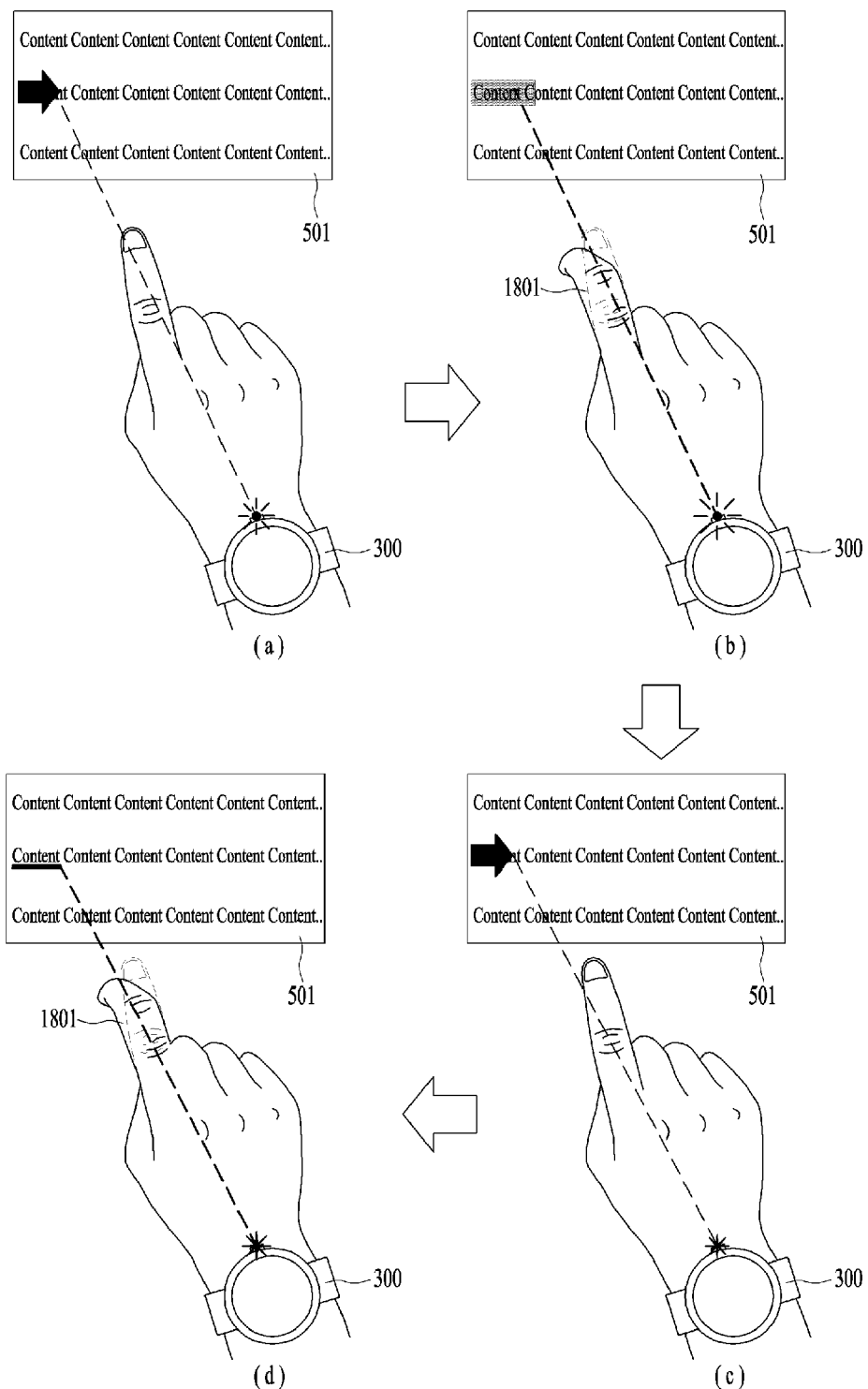
FIG. 18 is a diagram for an underlining control method using a laser pointer according to one embodiment of the present invention.

FIG. 18 is a diagram for an underlining control method using a laser pointer according to one embodiment of the present invention.

Referring to FIG. 18 (*a*), a laser pointer provided to a watch terminal 300 is pointing at a screen 501. And, a prescribed text data is currently outputted through the screen 501.

If a user inputs a prescribed gesture (e.g., a gesture 1801 of folding a finger shown in FIG. 18 (*b*)), the controller 180 can highlight a text along a path of the laser pointer. In particular, the controller 180 can give a highlight effect by sending a signal for controlling an external terminal.

As mentioned in the foregoing description with reference to FIG. 17, in case of changing a type of a laser pointer, referring to FIG. 18 (*c*) and FIG. 18 (*d*), the controller 180 can substitute the highlight effect with an underlining effect.

According to the descriptions with reference to FIGS. 12 to 18, control methods corresponding to a direct control mode are described. In the following description, a control method available in remote mode is described in detail with reference to the accompanying drawings.

Figure 19:
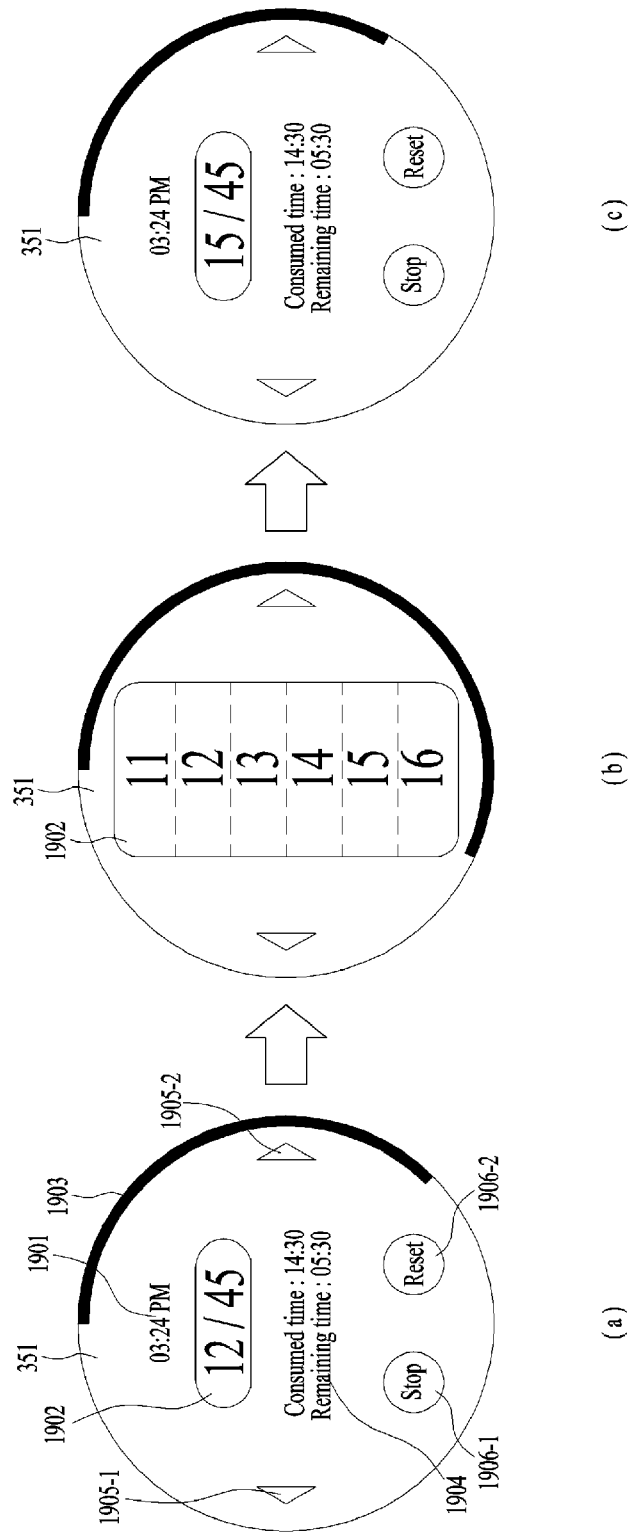
FIG. 19 is a diagram for one example of a control button outputted in remote mode according to one embodiment of the present invention.

FIG. 19 is a diagram for one example of a control button outputted in remote mode according to one embodiment of the present invention.

Referring to FIG. 19 (*a*), the watch terminal 300 is outputting examples of at least one control button or at least one indicator through the touchscreen 351. One example of the control button or the indicator is described as follows.

First of all, the watch terminal 300 may output a current time 1901 and an indicator 1904 indicating an elapse time after the start of the presentation in remote mode. The watch terminal 300 may be able to further output a button 1906-2 for resetting the elapse time and a button 1906-1 for stopping the elapse time.

Assuming that a presentation is currently made in a state that a presentation material is displayed on a screen, a user may desire to check a page of a currently displayed form document among total presentation form documents. Hence, according to one embodiment of the present invention, it is proposed to output a counting indicator 1902 indicating a location of the current form document among total form documents. The counting indicator 1902 may be represented as 'current form document page/total form document pages'. Moreover, it is proposed to further output a progress indicator 1903 indicating a progress status of a current form document among total form documents. Preferably, the progress indicator 1903 may be outputted to a rim of the touchscreen 351. In this case, the rim may have a shape of a circle. It may be able to output a progress extent at a rate of a currently progressive form document in a manner of progressing clockwise in total 360 degrees.

According to one embodiment of the present invention, as mentioned in the foregoing description, it is proposed to further output a button for controlling a connected external terminal (e.g., a personal computer currently outputting a screen, etc.) as well as the indicator indicating a progress status of a current presentation.

In particular, it is able to further output a previous button 1905-1 for moving to a previous form document from a current form document and a next button 1905 for moving to a next form document from the current form document.

Moreover, the present invention further proposes a control method of directly moving to a desired form document as well as the control method of moving to the previous/next form document. For instance, if an input of touching the counting indicator 1902 is received in FIG. 19 (*a*), the controller 180 can further output a form document list 1902. If a prescribed numeral is touched from the form document list 1902, the controller 180 may control the external terminal to directly move to the form document mapped to the touched numeral.

Meanwhile, according to one embodiment of the present invention, it is proposed to provide a user with a more effective screen. Particularly, when a presentation is given, it is important to adjust a presentation time not to exceed a prepared time. A function for helping this adjustment is described in detail with reference to FIG. 20 as follows.

Figure 20:
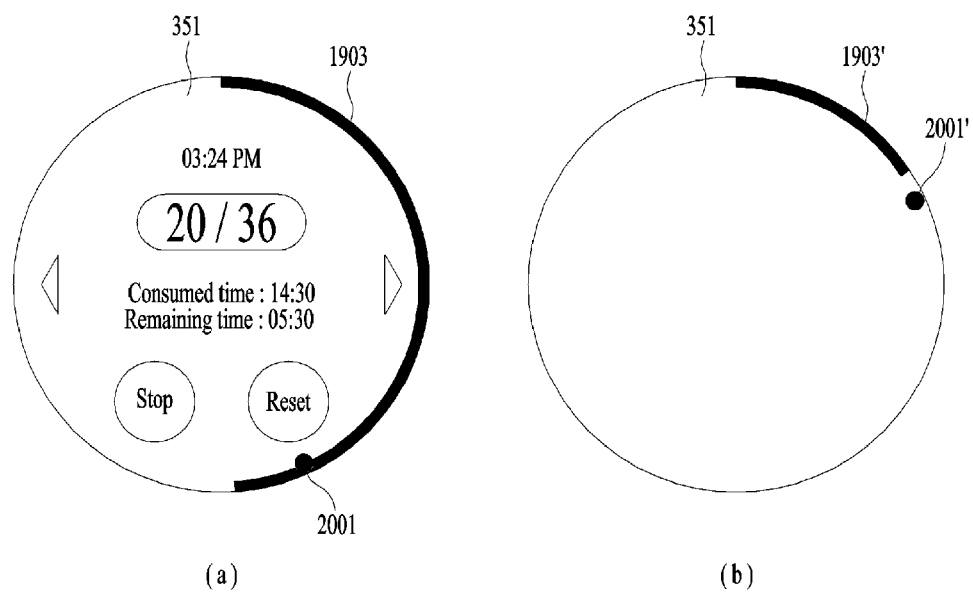
FIG. 20 is a diagram for a control method of assisting a presentation time to be adjusted according to one embodiment of the present invention.

FIG. 20 is a diagram for a control method of assisting a presentation time to be adjusted according to one embodiment of the present invention.

Referring to FIG. 20 (*a*), as mentioned in the foregoing description with reference to FIG. 19, a progress indicator 1903 is currently outputted. According to the embodiment described with reference to FIG. 20, it is proposed to further output a time elapse indicator 2001 indicating a current elapse time for a set target time.

The time elapse indicator 2001 can progress along a rim of the touchscreen 351 like the progress indicator 1903. In accordance with a current elapse time over a total target time, the time elapse indicator 2001 can be moved along the rim.

Moreover, in case that the time elapse indicator 2001 is ahead of the progress indicator 1903 indicating a progress extent of the presentation (i.e., the progress of the presentation is slow), it is able to further output a color changed progress indicator 1903' and a color changed time elapse indicator 2001' for the warning.

In the following description, one example of a warning method in case of expiration of a target presentation time is explained in detail with reference to FIG. 21.

Figure 21:
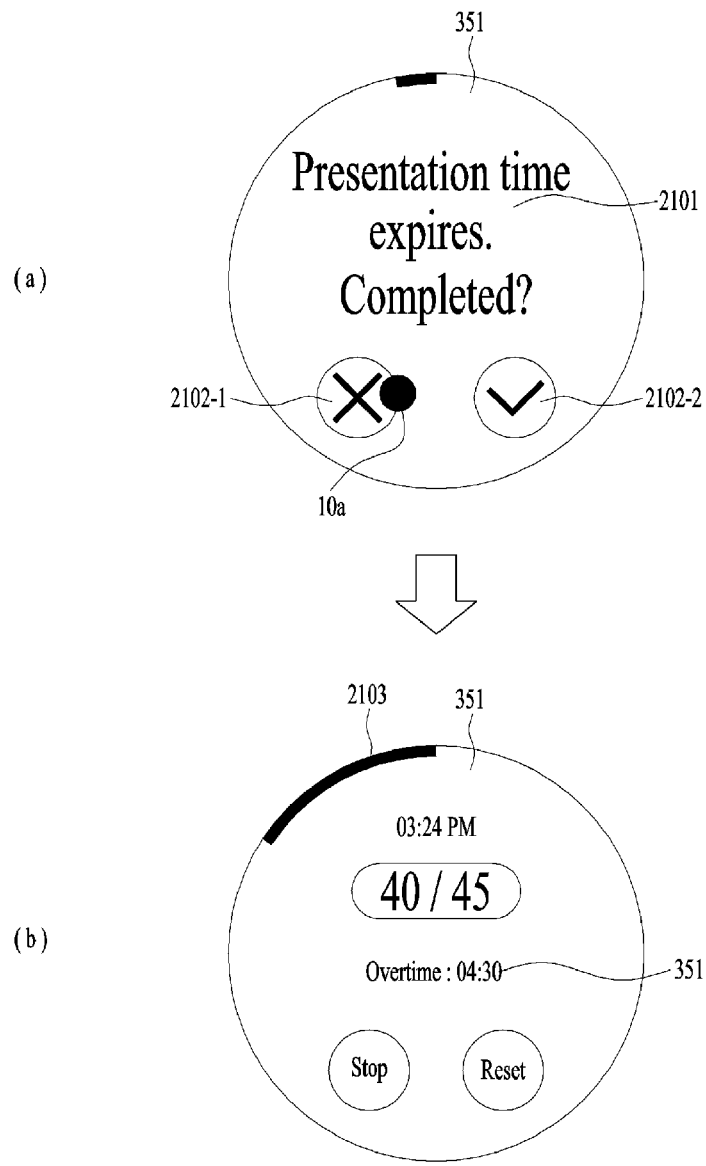
FIG. 21 is a diagram for a control method in case of an elapse of a target presentation time according to one embodiment of the present invention.

FIG. 21 is a diagram for a control method in case of an elapse of a target presentation time according to one embodiment of the present invention.

Generally, when a presentation is given, since limitation is put on a presentation time, if the presentation time expires, it is preferable to provide an appropriate notification. Hence, according to one embodiment of the present invention, if a set target presentation time expires, it is proposed to output a guide message 2101. If a confirm button 2102-2 is selected, it is able to stop a guide message output through the touchscreen 151 in direct. If a cancel button 2102 is selected, as shown in FIG. 21 (*b*), it is able to output a screen for an excessive presentation.

When the excessive presentation is given, according to one embodiment of the present invention. It is proposed to output an overtime progress indicator 2103 configured to progress in a direction opposite to a progressing direction of a progress indicator 1903. In doing so, like the progress indicator 1903, the overtime progress indicator 2103 may be preferably able to progress counterclockwise along a rim of the touchscreen 351.

And, the controller 180 may be able to further display what time the overtime is together with the overtime progress indicator 2103.

According to the above-described embodiment, it is proposed to switch a mode by detecting a rotation of the watch terminal 300. According to an embodiment mentioned in the following description, it is proposed to switch a mode based on a distance between a watch terminal 300 and a keyboard 2201.

Figure 22:
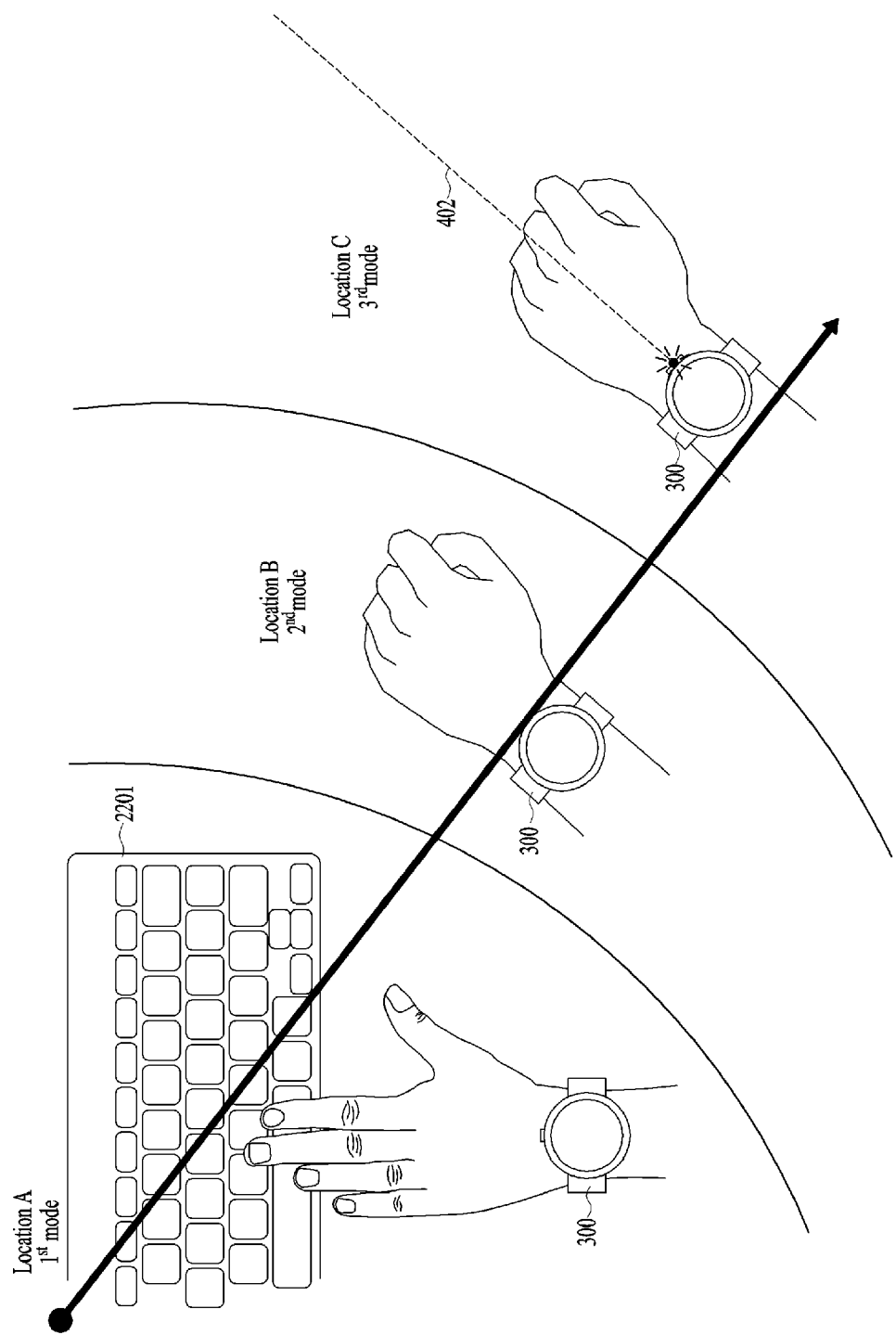
FIG. 22 is a diagram for a control method of switching a mode based on a distance from a keyboard according to one embodiment of the present invention.

FIG. 22 is a diagram for a control method of switching a mode based on a distance from a keyboard according to one embodiment of the present invention.

Generally, since it is difficult to distinguish a case for a user to use an air mouse using a watch terminal 300 from a case for a user to type using a keyboard 2201, the air mouse malfunctions frequently. Hence, according to one embodiment of the present invention, it is proposed to switch a keyboard use mode (i.e., a $1^{st}$ mode), a mouse use mode (i.e., a $2^{nd}$ mode) and a laser pointer use mode (i.e., a $3^{rd}$ mode) to one another based on a distance from a keyboard 2201.

Referring to FIG. 22, if a distance from a keyboard is a closest location A, the controller 180 operates in keyboard mode for using the keyboard. If a distance from a keyboard is a location B amounting to an intermediate distance, the controller 180 can operate by switching to a mouse mode. Finally, if a distance from a keyboard is a farthest location C, the controller 180 may operate in laser pointer mode.

Meanwhile, in case of the mouse mode, it may not be appropriate to be simultaneously used together with a basic function of a watch terminal 300. Hence, a control method for facilitating a switching to a basic function of a watch terminal 300 is described in detail with reference to FIG. 23 as follows.

Figure 23:
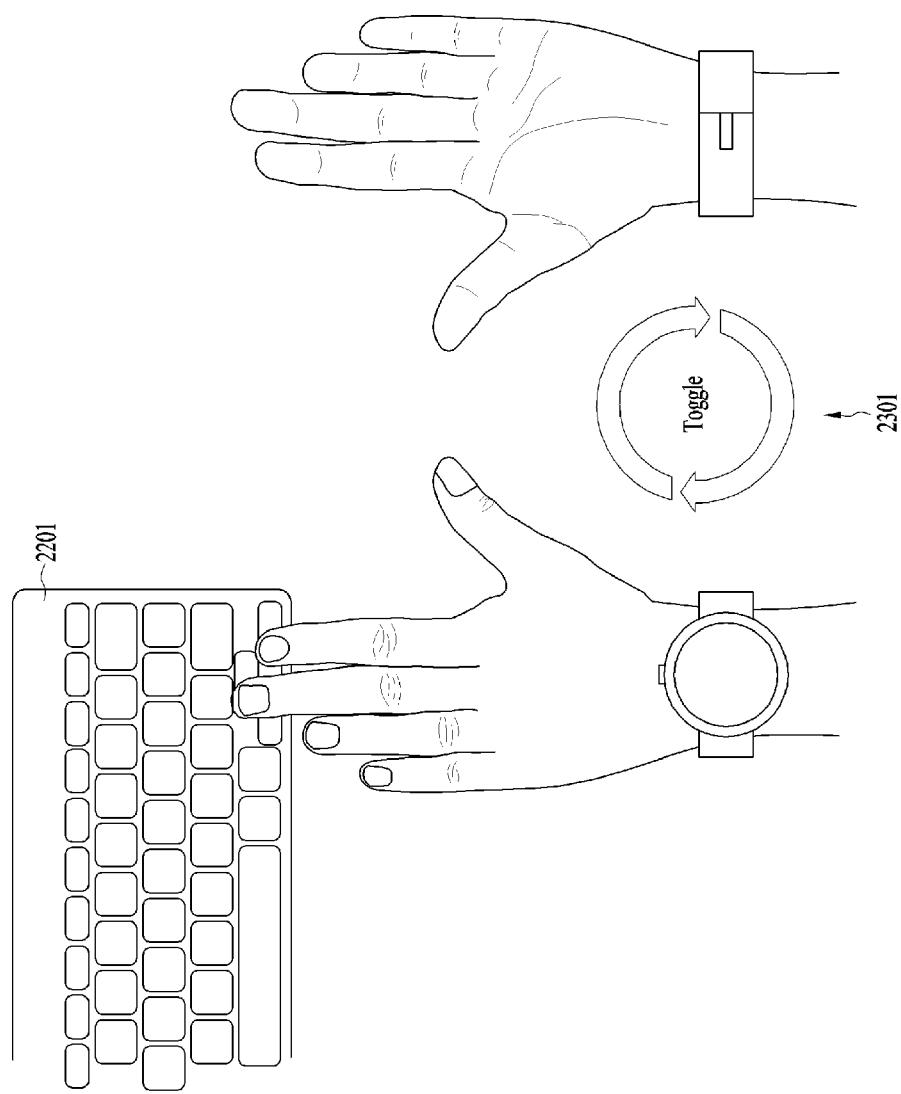
FIG. 23 is a diagram for a control method of switching a mouse mode and a basic mode to each other according to one embodiment of the present invention.

FIG. 23 is a diagram for a control method of switching a mouse mode and a basic mode to each other according to one embodiment of the present invention.

As mentioned in the foregoing description, it may not be appropriate to use a basic function of a watch terminal 300 in mouse mode. The reason for this is that a mouse cursor may be moved in response to a movement of the watch terminal 300.

Hence, according to one embodiment of the present invention, it is proposed to switch a basic mode, which is a mode of a general according to one embodiment of the present invention, and the above-mentioned mouse mode to each other by a most effective method.

Referring to FIG. 23, if a gesture 2301 of turning over a hand having a watch terminal 300 worn thereon is inputted, the controller 180 can switch a mouse mode and a basic mode to each other by toggling. For instance, if a gesture is inputted once, a mouse mode is entered. If the gesture is inputted again, the mouse mode can be switched to a basic mode again.

The turn-over gesture is just one example, by which the present embodiment is non-limited.

Meanwhile, the aforementioned mouse mode may include a type of using a proximity sensor or the like by putting a general mobile terminal 100 on a floor as well as a type of an air mouse using a watch terminal 300. Such an embodiment is described in detail with reference to FIG. 24 as follows.

Figure 24:
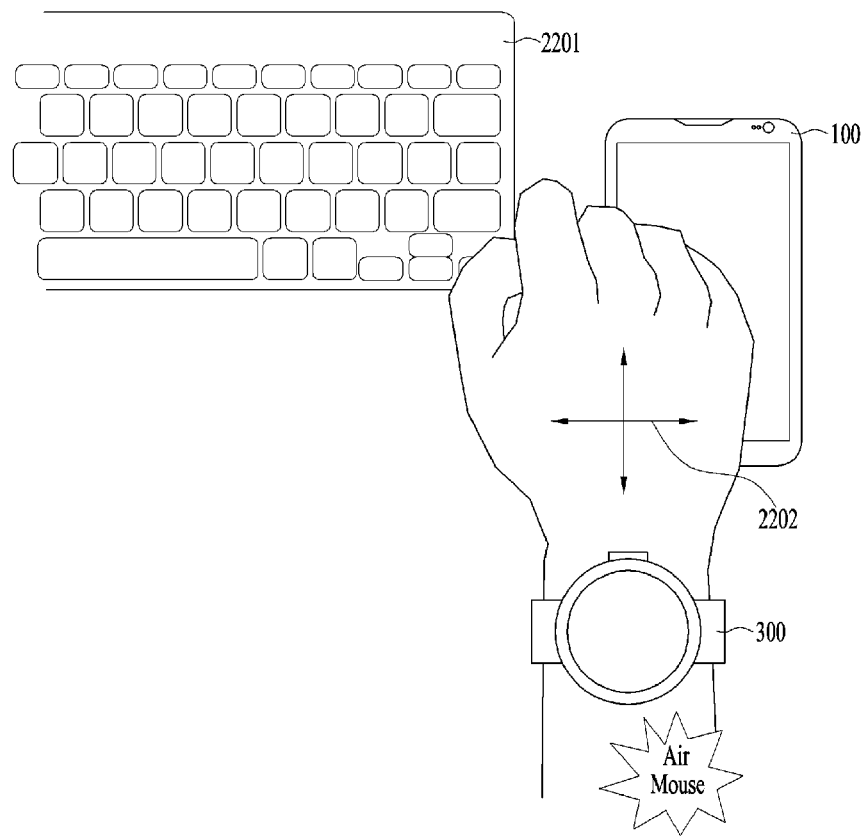
FIG. 24 is a diagram for a control method of running a mouse mode using a mobile terminal 100 of a general bar type according to one embodiment of the present invention.

FIG. 24 is a diagram for a control method of running a mouse mode using a mobile terminal 100 of a general bar type according to one embodiment of the present invention.

Referring to FIG. 24, the sensing unit 140 provided to a front side of the mobile terminal 100 may detect a motion 2202 of a hand (e.g., a fist in the drawing) in the front air in case of using a proximity sensor or the like. Hence, while the mobile terminal 100 is put on a floor, it may be able to perform an air mouse function using the hand in the air.

Meanwhile, according to one embodiment of the present invention, further proposed is a control method of facilitating a control of a left/right click available in mouse mode.

Generally, in case of using an air mouse using a watch terminal 300, it may not be easy to distinguish a left click and a right click from each other. According to one embodiment of the present invention, it is proposed to use a sound of tapping at a floor with a finger in order to distinguish a left click and a right click from each other.

A control method for registering a sound is described in detail with reference to FIG. 25 as follows.

Figure 25:
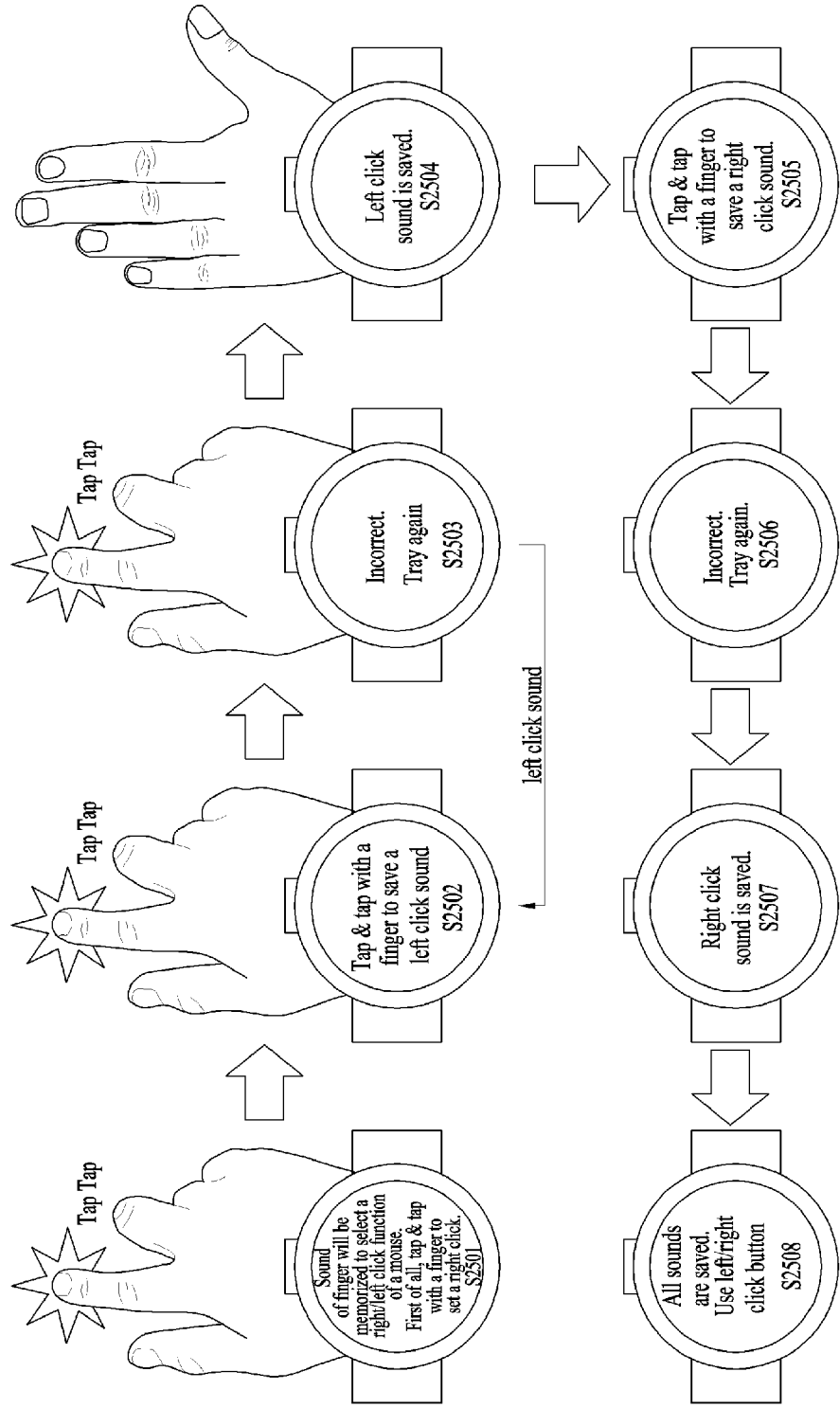

FIG. 25 and FIG. 26 are diagrams for a control method of distinguishing left/right click using a sound/pattern of tapping at a floor with a finger according to one embodiment of the present invention.

Referring to FIG. 25, in a step S2501, the controller 180 can output a guide text for a user to set up a left/right click. This guide text may guide that a sound or pattern to be used in applying a left/right click is required. In a step S2052, the controller 180 can request a sound or pattern for a left click.

If the sound or pattern is not accurately inputted, an input can be requested again [S2503].

If an analysis is accurately completed, it is able to output a guide text indicating that the corresponding sound or pattern has been saved [S3504].

The above-mentioned steps are identically applicable to a right click [S2505 to S2507].

In a step S2508, it is able to output a text indicating that the settings for both of the left click and the right click are complete. In the following description, a control method using a left/right click is described in detail with reference to FIG. 26.

Referring to FIG. 26 (a), if the left click pattern/sound 2601-1 registered by the procedure shown in FIG. 25 is inputted, the controller 180 can perform the left click of an air mouse function.

Likewise, referring to FIG. 26 (b), if the right click pattern/sound 2601-2 registered by the procedure shown in FIG. 25 is inputted, the controller 180 can perform the right click of the air mouse function.

In case of using a mobile terminal 100 of a general bar type, a control method of distinguishing a left click and a right click from each other is described in detail with reference to FIG. 27 and FIG. 28 as follows.

Figure 27:
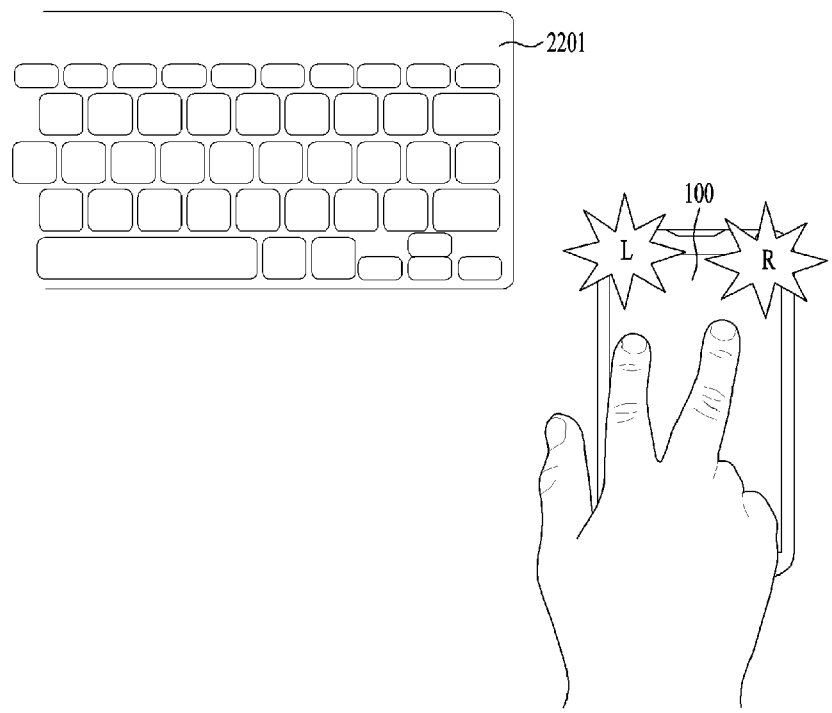
FIG. 27 and FIG. 28 are diagrams for a control method of distinguishing left/right click using a mobile terminal 100 of a bar type according to one embodiment of the present invention.
Figure 28:
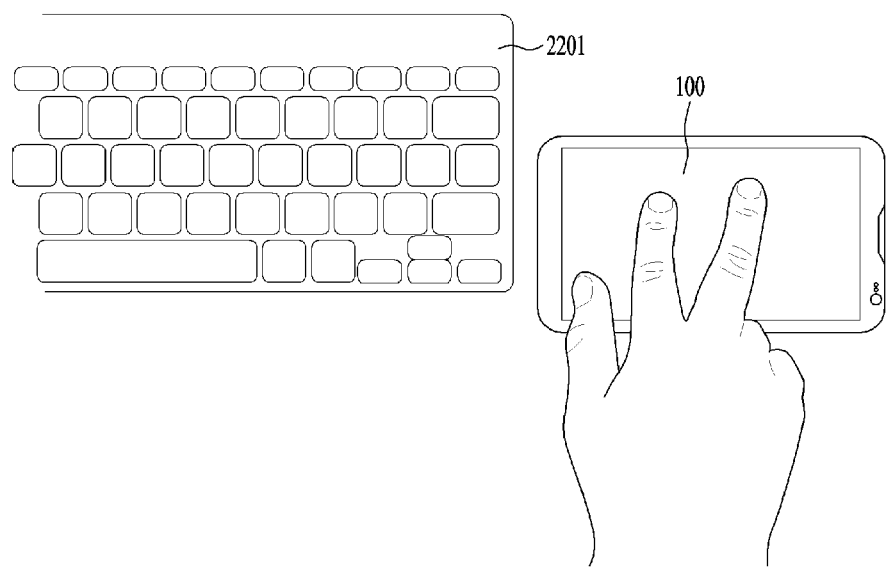

FIG. 27 and FIG. 28 are diagrams for a control method of distinguishing left/right click using a mobile terminal 100 of a bar type according to one embodiment of the present invention.

According to the embodiment related to FIG. 27, by determining that the mobile terminal 100 is touched with which finger using the sensing unit 140, it is proposed to distinguish a left click and a right click from each other based on a result of the determination.

Referring to FIG. 27, while the mobile terminal 100 is put on a floor, if the touchscreen 151 is touched with an index finger, the controller 180 can determine that a left click is inputted.

Likewise, referring to FIG. 27, while the mobile terminal 100 is put on a floor, if the touchscreen 151 is touched with a middle finger, the controller 180 can determine that a right click is inputted.

In doing so, in order to determine the middle finger or the index finger, the controller 180 may detect and distinguish a proximate distance of a corresponding finger, an intensity of light detected through an illuminance sensor, or the like.

According to the embodiment related to FIG. 28, the touchscreen of the mobile terminal 100 is partitioned in to a left touchscreen and a right touchscreen. If the left touchscreen 151 is touched, a left click can be performed. If the right touchscreen 151 is touched, a right click can be performed.

So far, the control method in the mouse mode is described. In the following description, a control method usable in the direct control mode shall be further described.

According to the embodiments described with reference to FIG. 29 and FIG. 30, assume that the watch terminal 300 is paired with such a device, which currently outputs a presentation data or the like, as a personal computer, a laptop or the like.

Figure 29:
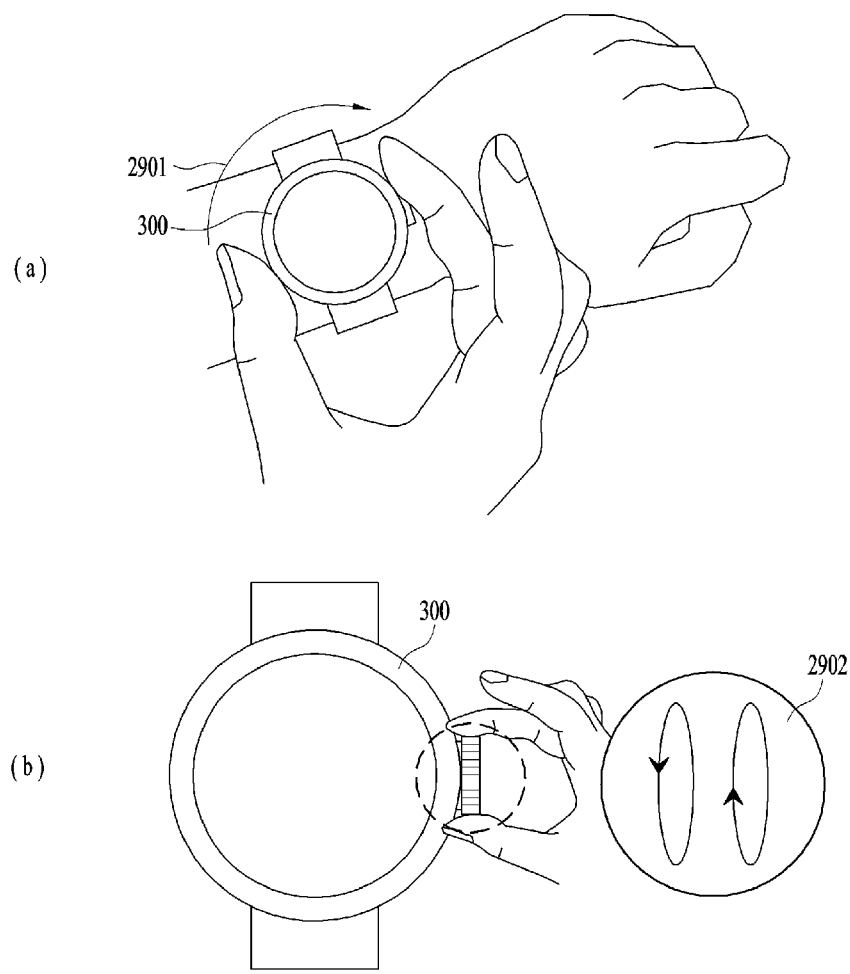
FIGS. 29 to 31 are diagrams for a control method of moving to a previous/next data according to one embodiment of the present invention.
Figure 30:
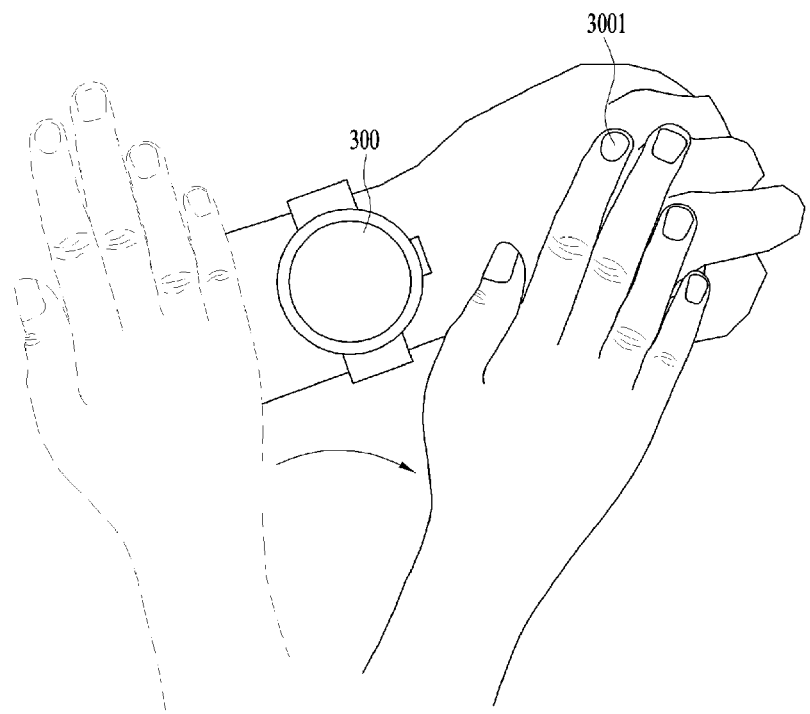
Figure 31:
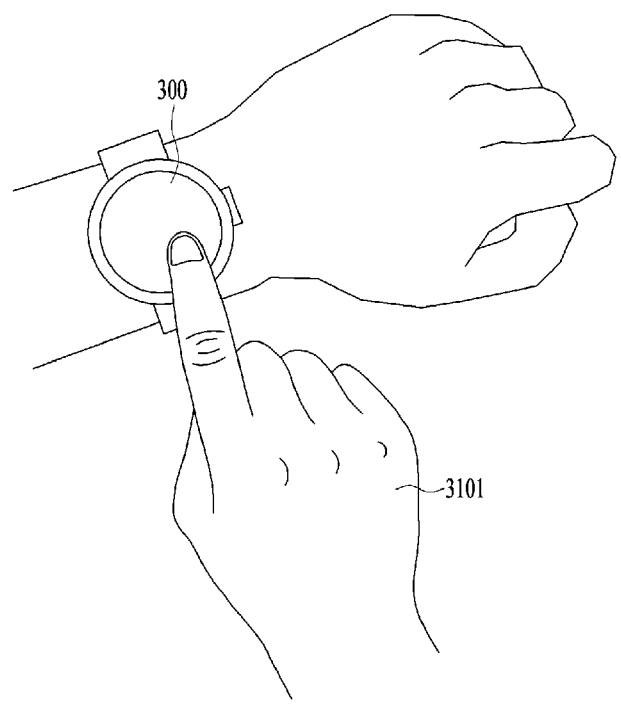

FIGS. 29 to 31 are diagrams for a control method of moving to a previous/next data according to one embodiment of the present invention.

Referring to FIG. 29 (a), in response to an input 2901 of turning a rim of the watch terminal 300 clockwise/counterclockwise, it is proposed to turn a current data to a previous/next data.

Referring to FIG. 29 (b), in response to an input 2902 of turning a stem of the watch terminal 300 clockwise/counterclockwise, it is proposed to turn a current data to a previous/next data.

Meanwhile, the data moving is just one example, by which one embodiment of the present invention is non-limited.

Referring to FIG. 30, in response to a gesture of moving left to right in the front air of the watch terminal 300, it is proposed to turn a current data to a next data.

In doing so, the sensing unit 140 provided to the front side of the watch terminal 300 may be able to recognize the above gesture using a result from a detection through the illuminance sensor and/or the proximity sensor.

On the other hand, in response to a gesture of moving right to left in the front air of the watch terminal 300, it is proposed to turn a current data to a previous data.

Referring to FIG. 31, it is proposed to turn a page based on a tap pattern 3101 (e.g., a knock pattern, a tapping pattern, etc.) inputted through the touchscreen 351 of the watch terminal 300. In particular, if a $1^{st}$ pattern is inputted, a current page may be turned to a next page. If a $2^{nd}$ pattern is inputted, a current page may be turned to a previous page.

The aforementioned embodiments take the examples of the connections to the personal computer that simply outputs presentation data, by which the present invention is non-limited. In the following description, one example of another connectible external terminal and functions in operating mode shall be additionally described in detail.

FIG. 32 is a diagram for a control method of selecting a prescribed external terminal from a plurality of external terminals according to one embodiment of the present invention.

According to one embodiment of the present invention mentioned in the following description, assume a case of being simultaneously paired with a plurality of external terminals. A control method of designating a specific external terminal among a plurality of the paired external terminals is described in detail as follows.

Referring to FIG. 32 (a), the watch terminal 300 is able to output an information, which indicates what is a currently designated external terminal among a plurality of the currently paired external terminals, through the touchscreen 351. According to the example shown in the drawing, the controller 180 is able to output an information 3201, which indicates that the watch terminal 300 is currently connected to a personal computer currently operating in PT mode, through the touchscreen 351. If an input 10b of flicking left/right is received, the controller 180 can output a screen 3202/3203 indicating a different external terminal, whereby the corresponding external terminal can be designated.

Referring to FIG. 32 (b), a screen 3203 corresponding to a TV is currently outputted. In doing so, if an input of touching the screen 3203 or an input 3204 of folding a finger is received, the controller 180 may be able to designate a corresponding external terminal.

An operation in a specific external terminal designated state shall be described in detail with reference to the accompanying drawing.

FIG. 33 is a diagram for switching a mode in a TV designated state according to one embodiment of the present invention.

Referring to FIG. 33 (a), if a watch terminal 300 worn by a user 3300 is rotated toward a TV 3301, it may be able to operate in $1^{st}$ mode (i.e., direct control mode). Hence, a cursor 3302 is outputted through the TV 3301 and the outputted cursor 3302 can be controlled using the watch terminal 300.

On the other hand, referring to FIG. 33 (b), if the watch terminal 300 worn by the user 3300 is rotated in a direction opposite to the TV 3301, it may be able to operate in $2^{nd}$ mode (i.e., remote mode). In the remote mode, the controller 180 may be able to output at least one or more control buttons 3303-1 to 3305 for controlling the TV 3301.

If a channel switch button 3304-1/3304-2 is selected, the controller 180 can transmit a control signal to enable the TV 3301 to switch a channel. If a volume adjust button 3303-

1/3303-2 is selected, the controller 180 may be able to transmit a control signal to enable the TV 3301 to adjust a volume.

If a function button 3305 is selected, the controller 180 can change a mode of the TV 3301 or turn off a power of the TV 3301.

If a button is pushed by a user, a value changed by the pushed button may be displayed at a center of the function button 3305.

In particular, according to one embodiment of the present invention, if the TV 3301 is faced, it is proposed that a mode is switched to enable a direct control by outputting the cursor through the TV 3301 itself. If the TV 3301 is not faced, it is proposed to use the watch terminal 300 as a remote controller. Such a control method is applicable to devices of other types. This is described by taken an air conditioner as an example with reference to FIG. 34 as follows.

FIG. 34 is a diagram for switching a mode in an air conditioner designated state according to one embodiment of the present invention.

Referring to FIG. 34 (a), if a watch terminal 300 worn by a user 3300 is rotated toward an air conditioner 3401, it may be able to operate in $1^{st}$ mode (i.e., direct control mode). Hence, a cursor 3402 is outputted through a display 3400 of the air conditioner 3401 and the outputted cursor 3402 can be controlled using the watch terminal 300.

On the other hand, referring to FIG. 34 (b), if the watch terminal 300 worn by the user 3300 is rotated in a direction opposite to the air conditioner 3401, it may be able to operate in $2^{nd}$ mode (i.e., remote mode). In the remote mode, the controller 180 may be able to output at least one or more control buttons 3403-1 to 3405 for controlling the air conditioner 3401.

If a wind direction control button 3404-1/3404-2 is selected, the controller 180 can change a wind direction of the air conditioner 3401. If a wind strength adjust button 3403-1/3403-2 is selected, the controller 180 may be able to transmit a control signal to change a wind strength of the air conditioner 3401.

If a function button 3405 is selected, the controller 180 can change a mode of the air conditioner 3401 or turn off a power of the air conditioner 3401.

If a button is pushed by a user, a value changed by the pushed button may be displayed at a center of the function button 3405.

FIG. 35 and FIG. 36 are diagrams of functions applicable to each external terminal and gestures for applying the corresponding functions.

Referring to FIG. 35 and FIG. 36, a TV 3301, an air conditioner 3401, a refrigerator 3504, a PC 3505 and a digital signage 3506 are taken as examples. A gesture 3501 of opening and closing a fist, an air mouse gesture 3502, a mouse click gesture 3503, a palm move gesture 3601, and a gesture 3602 of bending a wrist up and down are taken as examples of gestures.

Depending on an external terminal to be controlled, it is apparent that the same functions or the different functions may be matched to each other.

Meanwhile, the above-described function matching is just exemplary, by which the present invention is non-limited.

According to one embodiment of the present invention, it is proposed to output a guide indicator for a gesture for running a function. Such an embodiment is described in detail with reference to FIG. 37 and FIG. 38 as follows.

Figure 37:
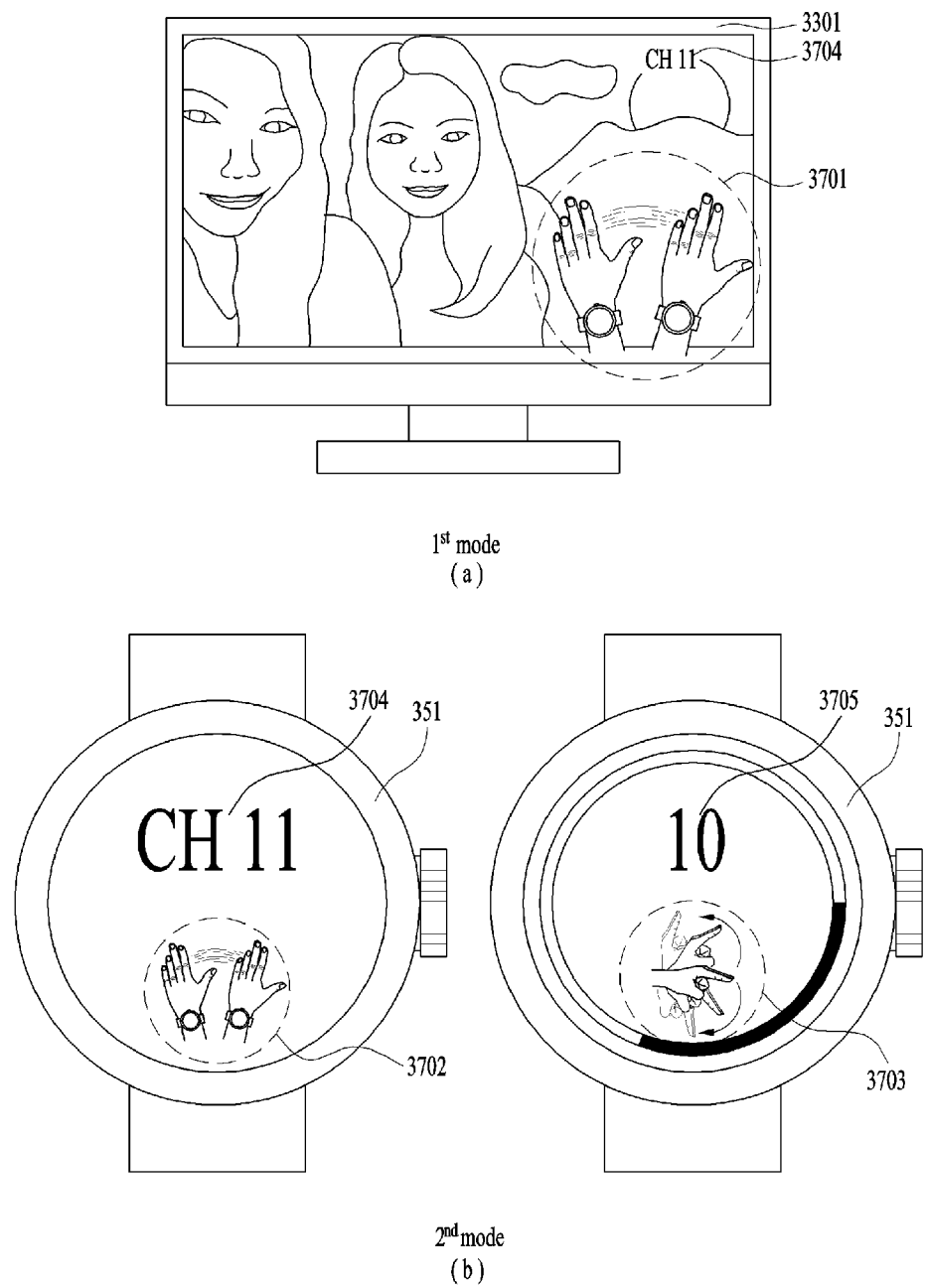
FIG. 37 is a diagram for a control method of outputting a guide indicator in a state that a TV 3301 is designated according to one embodiment of the present invention.

FIG. 37 is a diagram for a control method of outputting a guide indicator in a state that a TV 3301 is designated according to one embodiment of the present invention.

Referring to FIG. 37 (a), a guide indicator 3701 of a gesture mapped to a prescribed function of a TV 3301 is outputted through a prescribed region of the TV 3301.

Such an indicator may be outputted through a watch terminal 300 [3702, 3703] as well as through the TV 3301 [FIG. 37 (b)].

If a setting is changed by the gesture, the changed setting may be outputted through the watch terminal 300 [3704, 3705].

FIG. 38 is a diagram for a control method of outputting a guide indicator in a state that an air conditioner 3302 is designated according to one embodiment of the present invention.

Referring to FIG. 38 (a), a guide indicator 3802 of a gesture mapped to a prescribed function of an air conditioner 3302 is outputted through a display 3801 of the air conditioner 3302.

Such an indicator may be outputted through a watch terminal 300 [3803, 3804] as well as through the air conditioner 3302 [FIG. 38 (b)].

If a setting is changed by the gesture, the changed setting may be outputted through the watch terminal 300 [3805, 3806].

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

Accordingly, the present invention provides the following effects and/or features.

According to at least one of embodiments of the present invention, an external terminal to be controlled can be advantageously designated through an intuitive gesture.

According to at least one of embodiments of the present invention, a designated external terminal can be effectively controlled.

The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A watch terminal comprising:
a memory;
at least one of a sensor;
a touchscreen configured to receive a touch input from a user, wherein a rim of the touchscreen has a specific shape;
a wireless communication unit configured to pair with at least one of an external terminal; and
a controller coupled to the memory, the at least one of the sensor, the touchscreen and the wireless communication unit, wherein the controller is configured to:
control the wireless communication unit to transmit a control signal to a specific external terminal currently operating in a presentation mode among the at least one of the external terminal,
control the touchscreen to output a counting indicator indicating a current page with a total page in the presentation mode,
control the touchscreen to output a circular progress indicator indicating a progress status of the current page among the total page on a circular rim of the touchscreen, and
provide a warning feedback when it exceeds a set target time during the presentation mode.

2. The watch terminal of claim 1, wherein the controller is further configured to control a cursor to be outputted through a display unit of the specific external terminal, and to control the outputted cursor to move using the watch terminal.

3. The watch terminal of claim 1, wherein the controller is further configured to control the touchscreen to output a first button for moving to a previous page, a second button for moving to a next page and a third button for stopping an elapsed time.

4. The watch terminal of claim 3, wherein the controller is further configured to control the touchscreen to receive a first touch input to any one of the first button, the second button and the third button and to control the wireless communication unit to transmit the control signal corresponding to the first touch input to the specific external terminal in response to the reception of the first touch input.

5. The watch terminal of claim 1, wherein the controller is further configured to control the touchscreen to receive a second touch input for selecting the counting indicator and to control the touchscreen to output a page list in response to the reception of the second touch input.

6. The watch terminal of claim 5, wherein the controller is further configured to control the touchscreen to receive a third touch input for selecting a specific page on the page list and to control the specific external terminal to display the selected specific page in response to the reception of the third touch input.

7. A method of controlling a watch terminal, the method comprising:
receiving, via a touchscreen, a touch input from a user, wherein a rim of the touchscreen has a specific shape;
pairing, via a wireless communication unit, with at least one of an external terminal;
controlling, via a controller, the wireless communication unit to transmit a control signal to a specific external terminal currently operating in a presentation mode among the at least one of the external terminal;
controlling, via the controller, the touchscreen to output a counting indicator indicating a current page with a total page in the presentation mode;
controlling, via the controller, the touch screen to output a circular progress indicator indicating a progress status of the current page among the total page on a circular rim of the touchscreen; and
providing, via the controller, a warning feedback when it exceeds a set target time during the presentation mode.

8. The method of claim 7, further comprising:
controlling, via the controller, a cursor to be outputted through a display unit of the specific external terminal; and
controlling, via the controller, the outputted cursor to move using the watch terminal.

9. The method of claim 7, further comprising:
controlling, via the controller, the touchscreen to output a first button for moving to a previous page, a second button for moving to a next page and a third button for stopping an elapsed time.

10. The method of claim 9, further comprising:
controlling, via the controller, the touchscreen to receive a first touch input to any one of the first button, the second button and the third button; and
controlling, via the controller, the wireless communication unit to transmit the control signal corresponding to the first touch input to the specific external terminal in response to the reception of the first touch input.

11. The method of claim 7, further comprising:
controlling, via the controller, the touchscreen to receive a second touch input for selecting the counting indicator; and
controlling, via the controller, the touchscreen to output a page list in response to the reception of the second touch input.

12. The method of claim 11, further comprising:
controlling, via the controller, the touchscreen to receive a third touch input for selecting a specific page on the page list; and
controlling, via the controller, the specific external terminal to display the selected specific page in response to the reception of the third touch input.

* * * * *